US008177631B2

(12) United States Patent
Fujimoto et al.

(10) Patent No.: US 8,177,631 B2
(45) Date of Patent: May 15, 2012

(54) GAMING MACHINE WITH INSURANCE PAY AND PLAYING METHOD THEREOF

(75) Inventors: Jun Fujimoto, Tokyo (JP); Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1196 days.

(21) Appl. No.: 11/987,730

(22) Filed: Dec. 4, 2007

(65) Prior Publication Data

US 2008/0254872 A1 Oct. 16, 2008

Related U.S. Application Data

(60) Provisional application No. 60/907,670, filed on Apr. 13, 2007.

(51) Int. Cl.
*A63F 13/00* (2006.01)

(52) U.S. Cl. ................ 463/25; 463/16; 463/26; 463/30; 463/39

(58) Field of Classification Search .................... 463/16, 463/25, 26, 30, 39
See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,669,731 | A | 6/1987 | Clarke |
| 4,837,728 | A | 6/1989 | Barrie et al. |
| 4,964,638 | A | 10/1990 | Ishida |
| 5,178,390 | A | 1/1993 | Okada |
| 5,280,909 | A | 1/1994 | Tracy |
| 5,564,700 | A | 10/1996 | Celona |
| 5,611,730 | A | 3/1997 | Weiss |
| 5,639,088 | A | 6/1997 | Schneider et al. |
| 5,695,402 | A | 12/1997 | Stupak |
| 5,702,303 | A | 12/1997 | Takemoto et al. |
| 5,770,533 | A | 6/1998 | Franchi |
| 5,820,459 | A | 10/1998 | Acres et al. |
| 5,836,817 | A | 11/1998 | Acres et al. |

(Continued)

FOREIGN PATENT DOCUMENTS

DE 3242890 5/1984

(Continued)

OTHER PUBLICATIONS

Macau Official Action and Search Report, English translations included, dated Oct. 22, 2009.

*Primary Examiner* — Pierre Eddy Elisca
*Assistant Examiner* — Shahid Kamal
(74) *Attorney, Agent, or Firm* — NDQ&M Watchstone LLP

(57) ABSTRACT

A gaming machine includes a display for displaying an image relating to a unit game, in which it is determined whether or not an awarding outcome is provided to a player, a counter for accumulating a count-value with successive execution of the unit games and resetting the count-value when a predefined reset condition is met, and a controller. The controller receives a first wager on the unit game and awards a predefined payout to the player when an outcome of the unit game turns out to be a specific outcome. The controller also receives a second wager for the insurance pay. Furthermore, the controller executes transition into a free game which does not require the first wager, when the count-value reaches a predefined value in the unit game with the second wager, and provides the insurance pay according to an outcome of the free game.

2 Claims, 21 Drawing Sheets

U.S. PATENT DOCUMENTS

| | | | | |
|---|---|---|---|---|
| 5,890,963 | A | 4/1999 | Yen | |
| 5,910,048 | A | 6/1999 | Feinberg | |
| 6,001,016 | A | 12/1999 | Walker et al. | |
| 6,003,013 | A | 12/1999 | Boushy et al. | |
| 6,089,980 | A | 7/2000 | Gauselmann | |
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,375,567 | B1 | 4/2002 | Acres | |
| 6,695,697 | B1 | 2/2004 | Okada | |
| 6,932,704 | B2 | 8/2005 | Walker et al. | |
| 6,932,707 | B2 | 8/2005 | Duhamel | |
| 7,585,222 | B2 * | 9/2009 | Muir | 463/25 |
| 7,682,248 | B2 * | 3/2010 | Baerlocher et al. | 463/27 |
| 2003/0069073 | A1 | 4/2003 | Okada | |
| 2006/0205495 | A1 | 9/2006 | Fujimoto | |
| 2006/0211485 | A1 | 9/2006 | Fujimoto | |
| 2008/0026822 | A1 * | 1/2008 | Walker et al. | 463/25 |
| 2008/0119262 | A1 * | 5/2008 | Okada | 463/20 |
| 2008/0188308 | A1 * | 8/2008 | Shepherd et al. | 463/39 |
| 2009/0203433 | A1 * | 8/2009 | Olivas et al. | 463/25 |
| 2009/0233705 | A1 * | 9/2009 | Lemay et al. | 463/25 |

FOREIGN PATENT DOCUMENTS

| | | | |
|---|---|---|---|
| DE | 3712841 | | 11/1988 |
| DE | 4137010 | | 8/1992 |
| DE | 10049444 | | 11/2001 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | WO03/083795 | A1 | 10/2003 |
| WO | WO2004/095383 | A1 | 11/2004 |

* cited by examiner

PAYOUT TABLE

| ALL PAYS ON PAYLINE | 1ST Credit | 2ND Credit | 3RD Credit |
|---|---|---|---|
|  DOUBLE DOUBLE DOUBLE | 800 | 1600 | 2400 |
| BAR BAR BAR<br>BAR BAR BAR<br>BAR BAR BAR | 60 | 120 | 180 |
| BAR BAR BAR<br>BAR BAR BAR | 30 | 60 | 90 |
|  | 20 | 40 | 60 |
| BAR BAR BAR | 15 | 30 | 45 |
| ANY ANY ANY<br>BAR BAR BAR | 5 | 10 | 15 |
| ANY 2  | 5 | 10 | 15 |
| ANY 1  | 2 | 4 | 6 |

FIG. 24A
FIG. 24B
33
316
RESCUE
PAY
START
FREE GAME
Q1
Q2
Q3
PAID
90
BET
3
$1
CREDIT
876
16
RESCUE
PAY
252
START
FREE GAME

GAMING MACHINE WITH INSURANCE PAY AND PLAYING METHOD THEREOF

CROSS-REFERENCE TO RELATED APPLICATION

This application is based upon and claims the benefit of U.S. Provisional Patent Application Ser. No. 60/907,670, filed on Apr. 13, 2007; the entire contents of which are incorporated herein by reference for all purposes.

BACKGROUND OF THE INVENTION

1. Field of the Invention

The present invention relates to a gaming machine with which a wager for insurance pay can be placed and a playing method thereof.

2. Description of the Related Art

At a facility where gaming machines such as slot machines are installed, a player can play a game by placing a wager (coins etc.) on the gaming machine. (For example, a gaming machine such as slot machines is disclosed in U.S. Pat. Nos. 5,820,459, 6,695,697, U.S. Laid-Open Patent Application No. 2003/0069073, European Laid-Open Patent Application No. 1192975, U.S. Pat. Nos. 6,254,483, 5,611,730, 5,639,088, 6,257,981, 6,234,896, 6,001,016, 6,273,820 6,224,482, 4,669,731, 6,244,957, 5,910,048, 5,695,402 6,003,013, 4,283,709, European Laid-Open Patent Application No. 0631798, German Laid-Open Patent Application No. 4137010, Great Britain Laid-Open Patent Application No. 2326830, German Laid-Open Patent Application No. 3712841, U.S. Pat. Nos. 4,964,638, 6,089,980, 5,280,909, 5,702,303, 6,270,409, 5,770,533, 5,836,817, 6,932,704, 6,932,707, 4,837,728, European Laid-Open Patent Application No. 1302914, U.S. Pat. Nos. 4,624,459, 5,564,700, PCT Laid-Open Application No. 03/083795, German Laid-Open Patent Application No. 3242890, European Laid-Open Patent Application No. 0840264, German Laid-Open Patent Application No. 10049444, PCT Laid-Open Application No. 04/095383, European Laid-Open Patent Application No. 1544811, U.S. Pat. No. 5,890,963, European Laid-Open Patent Application No. 1477947, and European Laid-Open Patent Application No. 1351180.)

With a slot machine, for example, each time the player places a wager and presses a start switch, a unit game is executed for scrolling and rearranging symbols at respective areas on a display. Then, when the combination of the stopped symbols turns out to be a predefined winning combination, a payout is provided to the player according to the winning combination.

Furthermore, a jackpot payout may be also provided. In other words, a portion of the wager is accumulated for the jackpot in the slot machine. Then, whether or not to provide a payout of the jackpot is determined at a predefined timing, and the accumulated credits for the jackpot are provided to the player when it is determined to provide the payout.

SUMMARY OF THE INVENTION

A gaming machine with an insurance pay according to a first aspect of the present invention, comprises: a display for displaying an image relating to a unit game, in which it is determined whether or not an awarding outcome is provided to a player; a counter for accumulating a count-value with successive execution of the unit games, and resetting the count-value when a predefined reset condition is met; and a controller. The controller is operable to: (a) receive a first wager on the unit game; (b) award a predefined payout to the player when an outcome of the unit game turns out to be a specific outcome; (c) receive a second wager for the insurance pay; (d) accumulate the count-value with successive execution of the unit games; (e) execute transition into a free game which does not require the first wager, when the count-value reaches a predefined value in the unit game with the second wager; and (f) provide the insurance pay according to an outcome of the free game.

According to a second aspect of the present invention, in the above gaming machine, the count-value is any one of the number of executed unit games, a wager amount of the first wager, and a difference between a wager amount of the first wager and a payout amount in the unit game.

According to a third aspect of the present invention, in the above gaming machine, the predefined reset condition is that the outcome of the unit game turns out to be the specific outcome.

A gaming machine with an insurance pay according to a fourth aspect of the present invention, comprises: a display for displaying an image relating to a unit game, in which it is determined whether or not an awarding outcome is provided to a player; a counter for accumulating a count-value with successive execution of the unit games, and resetting the count-value when a predefined reset condition is met; and a controller. The controller operable to: (a) receive a first wager on the unit game; (b) award a predefined payout to the player when an outcome of the unit game turns out to be a specific outcome; (c) receive a second wager for the insurance pay; (d) accumulate the count-value with successive execution of the unit games; (e) execute transition into a free game which does not require the first wager, when the count-value reaches a predefined value in the unit game with the second wager; and (f) determine the number of execution times of the free game at random; and (g) provide the insurance pay according to an outcome of the free game.

According to a fifth aspect of the present invention, in the above gaming machine, the count-value is any one of the number of executed unit games, a wager amount of the first wager, and a difference between a wager amount of the first wager and a payout amount in the unit game.

According to a sixth aspect of the present invention, in the above gaming machine, the predefined reset condition is that the outcome of the unit game turns out to be the specific outcome.

A gaming machine with an insurance pay according to a seventh aspect of the present invention, comprises: a display for displaying an image relating to a unit game, in which it is determined whether or not an awarding outcome is provided to a player; a counter for accumulating a count-value with successive execution of the unit games, and resetting the count-value when a predefined reset condition is met; and a controller. The controller is operable to: (a) receive a first wager on the unit game; (b) award a predefined payout to the player when an outcome of the unit game turns out to be a specific outcome; (c) receive a second wager for the insurance pay; (d) accumulate the count-value with successive execution of the unit games; (e) execute transition into a fixed number of free games which do not require the first wager, when the count-value reaches a predefined value in the unit game with the second wager; and (f) provide the insurance pay according to an outcome of the free game.

According to an eighth aspect of the present invention, in the above gaming machine, the count-value is any one of the number of executed unit games, a wager amount of the first wager, and a difference between a wager amount of the first wager and a payout amount in the unit game.

According to a ninth aspect of the present invention, in the above gaming machine, the predefined reset condition is that the outcome of the unit game turns out to be the specific outcome.

A playing method of a gaming machine with an insurance pay according to a tenth aspect of the present invention comprises: placing a first wager on a unit game; awarding a predefined payout to a player when an outcome of the unit game turns out to be a specific outcome; placing a second wager for the insurance pay; accumulating a count-value with successive execution of the unit games with the second wager, the count-value being reset when a predefined reset condition is met; executing transition into a free game which does not require the first wager, when the count-value reaches a predefined value in the unit game with the second wager; and providing the insurance pay according to an outcome of the free game.

According to an eleventh aspect of the present invention, in the above playing method of a gaming machine, the count-value is any one of the number of executed unit games, a wager amount of the first wager, and a difference between a wager amount of the first wager and a payout amount in the unit game.

According to a twelfth aspect of the present invention, in the above playing method of a gaming machine, the predefined reset condition is that the outcome of the unit game turns out to be the specific outcome.

A playing method of a gaming machine with an insurance pay according to a thirteenth aspect of the present invention comprises: placing a first wager on a unit game; awarding a predefined payout to a player when an outcome of the unit game turns out to be a specific outcome; placing a second wager for the insurance pay; accumulating a count-value with successive execution of the unit games with the second wager, the count-value being reset when a predefined reset condition is met; executing transition into a free game which does not require the first wager, when the count-value reaches a predefined value in the unit game with the second wager, the number of execution times of the free game being determined at random; and providing the insurance pay according to an outcome of the free game.

According to a fourteenth aspect of the present invention, in the above playing method of a gaming machine, the count-value is any one of the number of executed unit games, a wager amount of the first wager, and a difference between a wager amount of the first wager and a payout amount in the unit game.

According to a fifteenth aspect of the present invention, in the above playing method of a gaming machine, the predefined reset condition is that the outcome of the unit game turns out to be the specific outcome.

A playing method of a gaming machine with an insurance pay according to a sixteenth aspect of the present invention comprises: placing a first wager on a unit game; awarding a predefined payout to a player when an outcome of the unit game turns out to be a specific outcome; placing a second wager for the insurance pay; accumulating a count-value with successive execution of the unit games with the second wager, the count-value being reset when a predefined reset condition is met; executing transition into a fixed number of free games which do not require the first wager, when the count-value reaches a predefined value in the unit game with the second wager; and providing the insurance pay according to an outcome of the free game.

According to a seventeenth aspect of the present invention, in the above playing method of a gaming machine, the count-value is any one of the number of executed unit games, a wager amount of the first wager, and a difference between a wager amount of the first wager and a payout amount in the unit game.

According to an eighteenth aspect of the present invention, in the above playing method of a gaming machine, the predefined reset condition is that the outcome of the unit game turns out to be the specific outcome.

DETAILED DESCRIPTION OF THE EMBODIMENTS

Figure 1:
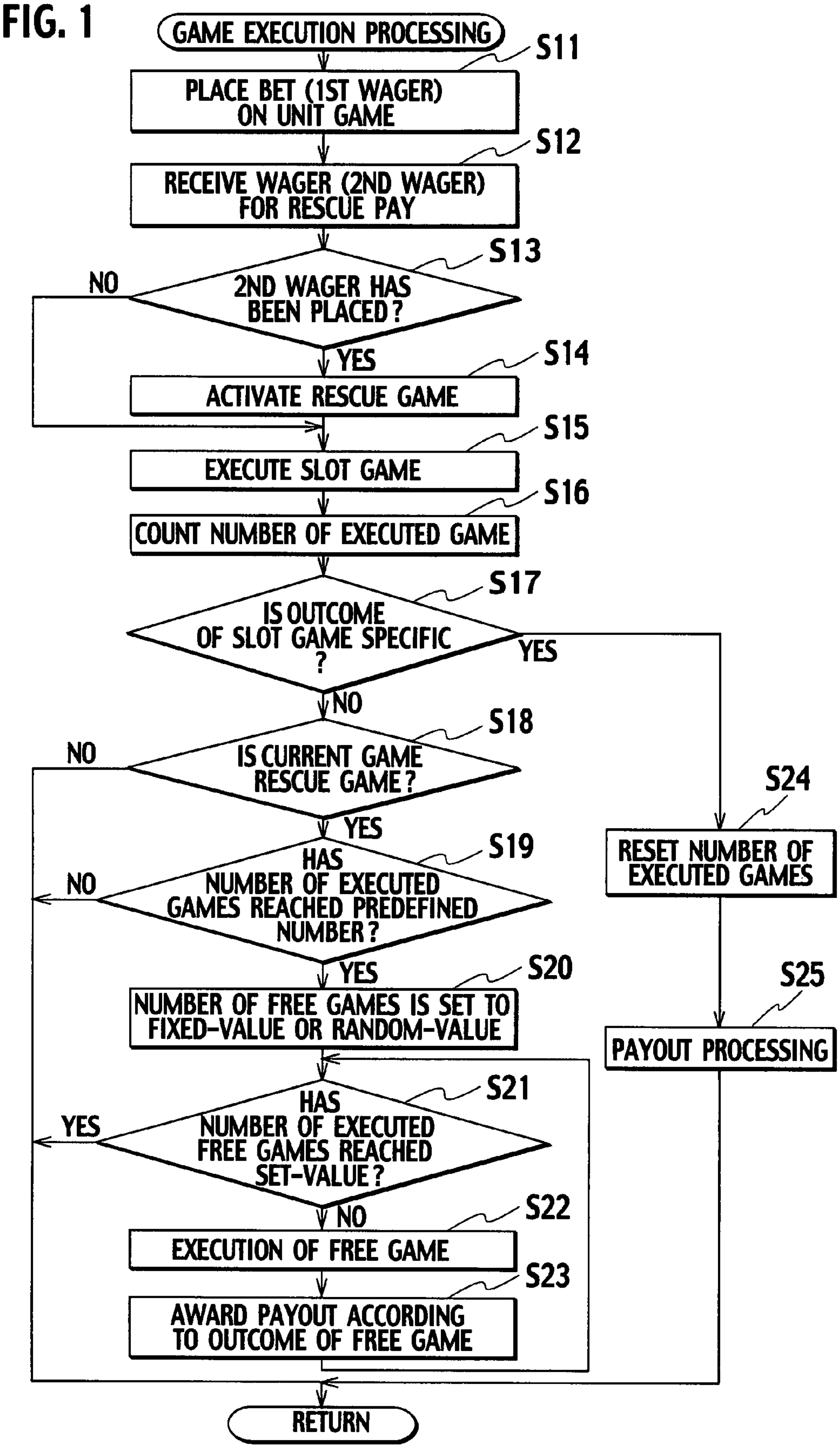
FIG. 1 is a flow chart illustrating the overview procedures of a slot machine according to one embodiment of the present invention.
Figure 2:
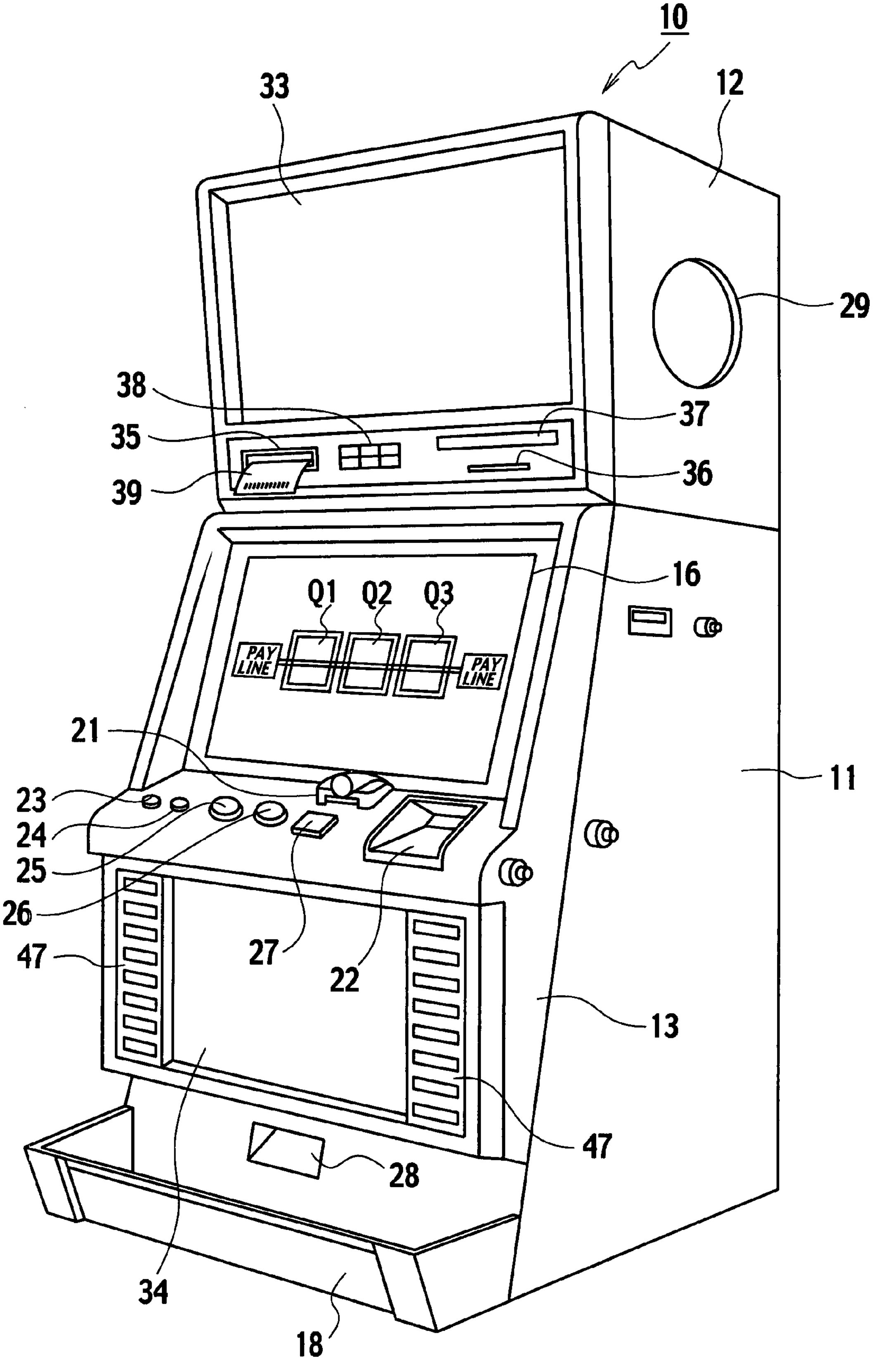
FIG. 2 is a perspective view illustrating an arrangement of the slot machine according to one embodiment of the present invention.

The outline of the operation of the slot machine, which is an example of the gaming machine according to the present invention, will be described below with reference to the flow chart of FIG. 1 and the perspective view of a slot machine 10 of FIG. 2.

First, the slot machine 10 of the present embodiment receives a bet (a first wager) on a unit game, which is an executing unit of slot games (step S11). Specifically, medals or coins are inserted, or a bet of monetary information is received.

Subsequently, the slot machine 10 receives a wager (a second wager) for an insurance pay (referred to as "rescue pay" hereinafter; "insurance pay" and "rescue pay" are both pending applications for trademark registration) (step S12). Here, the term "rescue pay" means, as described below, a payout provided to the player according to an outcome of a free game which does not require a wager. The free game is executed when (i) the number of unit games without a predefined payout amount (e.g., corresponding to 60 or more medals per bet) has reached an upper limit (e.g., 1000 games), or (ii) the bet amount during successive executed unit games without a predefined payout amount reaches an upper limit (e.g., amount equivalent to 3000 medals).

Subsequently, it is determined whether or not the second wager has been placed (step S13). If the second wager has been placed (YES in step S13), a rescue game is activated (step S14). In this manner, upon placing of the second wager, subsequent unit games are activated as rescue games. After activation of the rescue game, the slot game is executed (step S15).

On the other hand, if the second wager has not been placed (NO in step S13), the slot game is executed without activating the rescue game (step S15).

In the slot game, symbols are scrolled on each of three display areas Q1 to Q3 triggered by the player's pressing down a start switch 27, and are subsequently stopped. Then, if the combination of the symbols displayed on the display areas Q1 to Q3 (outcome of the slot game) turns out to be a winning combination, a payout is provided to the player according to the winning combination.

Subsequently, the number of executed games (or expended bet amount) is counted (step S16). Next, it is determined whether or not the outcome of the slot game is a specific outcome (step S17). Here, "specific outcome" is, for example, a case in which the payout per medal reaches or exceeds 60. Specifically, it is a case when "DOUBLE" (specific symbol) or "triple BAR" (specific symbol) shown in FIG. 18 has aligned across the three display areas Q1 to Q3.

Then, in the case of the specific outcome (YES in step S17), the number of executed games (or expended bet amount) counted in the processing in step S16 is reset (step S24) Subsequently, a payout is provided to the player according to the specific outcome (step S25).

On the other hand, if the outcome of the game is not a specific outcome (NO in step S17), it is determined whether or not the current game is a game with a rescue pay (referred to as a "rescue game", hereinafter) (step S18). In case of the rescue game (in case that the wager for the rescue pay [the second wager] has been placed in step S12: YES in step S18), it is determined whether or not the number of executed games has reached an upper limit (predefined value) (step S19).

Then, if the number of executed games has reached the upper limit, the number of free games is set to a random-value (or a fixed-value) (step S20). The random-value is randomly determined each time, whereas the fixed-value is predefined.

Furthermore, it is determined whether or not the number of executed free games has reached a number which has been set in step S20 (step S21). If the number of the executed free games has not reached the set number of times (NO in step S21), the free game is executed (continued) (step S22).

Then, a payout according to the outcome of the free game executed in step S22 is provided to the player (step S23). The processing of steps S21 to S23 is repeated until the number of executed free games reaches the number which has been set in step S20. If the number of executed free games has reached the set number (YES in step S21), the processing returns to the above-mentioned step S11 and the processing will be repeated similarly, afterwards.

With the slot machine 10 as thus described, if the second wager for the rescue pay has been placed, the free games, which do not require the first wager, are executed when the number of times of the successive unit games without the specific outcome reaches the predefined number of times.

Then, the payouts are provided to the player according to the outcomes of the free games. In other words, the payout amount of the rescue pay varies according to the outcomes of the free games. Additionally, since the number of executed free games may vary, the payout amounts of all the free games (in other words, the total payout amount of the rescue pay) may vary.

As thus described, since the amount of rescue pay may vary, the gaming entertainment relating to the rescue pay can be provided to the player, as well as the gaming entertainment relating to the unit game.

As stated above, the payout of the rescue pay is provided to the player according to the outcomes of the executed free games, if the second wager for the rescue pay is placed and the number of executed games without the predefined payout (e.g., ×60 or higher payout) has reached the predefined upper limit (e.g., 1000 games) (or the expended wager has reached the predefined upper limit). As a result, the player can suppress loss of wager.

Next, an arrangement of the slot machine 10 of the present embodiment will be described in detail. The slot machine 10 of the present embodiment includes a cabinet 11 and a top box 12 provided on top of the cabinet 11, as shown in FIG. 2. The cabinet 11 has a main door 13. A lower LCD 16 is disposed on the front of the cabinet 11 facing the player. Inside the cabinet 11 are disposed various component devices such as a controller 40 and a hopper 44 (see FIG. 3). The controller 40 electrically controls the slot machine 10. The hopper 44 controls insertion, storage, and payout of medals.

In the present embodiment, medals are used for a wager when playing a game. Gaming media for the wager is not only limited to medals, but coins, tokens, electronic money, or other equivalent electronic value information may also be used.

The main door 13 is attached to the cabinet 11 so that it can be opened or closed. The lower LCD 16 is provided on an upper portion of the main door 13. As described below, the lower LCD 16 displays images relating to a variety of games including a slot game. In the slot game, symbols are scrolled (switched over) on each of the three display areas Q1 to Q3 arranged in a lateral direction, and subsequently come to a stop. As a result, any one of the symbols rests on each of the display areas Q1 to Q3. Then, if a symbol combination on the display areas Q1 to Q3 is a winning combination (see FIG. 24), a payout is provided to the player according to the winning combination. Note that, data of the payout amount may be stored (as credits) in the memory, instead of cashing out medals. This payout method can be selected by the player. The credits stored in the memory can be cashed out as medals by the player's predefined operation.

A medal insertion slot 21 and a bill validator 22 are disposed at a lower part of the lower LCD 16. Medals are inserted into the medal insertion slot 21 when playing a game. The bill validator 22 validates bills and accepts valid ones. Various operational switches are disposed nearby the medal insertion slot 21 and the bill validator 22.

A cash-out switch 23, a max bet switch 24, a bet switch 25, a repeat bet switch 26, and a start switch 27 are provided as operational switches.

The bet switch 25 is a switch for determining bet amount on the slot game, which is executed on the lower LCD 16. Each time the bet switch 25 is pressed, a bet equivalent to one medal is placed.

The Repeat bet switch 26 is a switch for placing a same bet as the bet on the previous game.

The start switch 27 is a switch for starting the slot game on the lower LCD 16 after the bet is placed. After the medal(s) is inserted into the medal insertion slot 21 or the bet is placed by the bet switch 25, the slot game on the display areas Q1 to Q3 of the lower LCD 16 is started by pressing the start switch 27.

The cash-out switch 23 is a switch for paying out medals. The medals are paid out onto a medal tray 18 from a medal cash-out opening 28 disposed on the front lower part of the main door 13.

The max bet switch 24 is a switch for placing a maximum bet (e.g., equivalent to three medals) that can be bet on a single game by one pressing. The maximum bet that can be bet on a single slot game may be changed by operation of the administrator. For example, a bet equivalent to 50 medals can be placed.

A foot display 34 is disposed on the lower front of the main door 13. Various images relating to the game (such as characters of the slot machine 10) are displayed on the foot display 34.

Lamps 47 are provided on both sides of the foot display 34. The lamp 47 emits light based on a preset light emission pattern. The medal cash-out opening 28 is provided on the lower part of the foot display 34.

An upper LCD 33 is disposed on the front of the top box 12. The number of medals to be paid out according to the combination of the symbols and other effect images are displayed on the upper LCD 33.

Speakers 29 are provided on the top box 12. A ticket printer 35, a card reader 36, a data display 37, and a keypad 38 are disposed on the lower part of the upper LCD 33. The ticket printer 35 prints out a ticket 39 having data such as a possessing credit value, time and date, identification number of the slot machine 10 printed thereon as a bar code.

The player can play a game at another slot machine by using the bar-coded ticket 39, and exchange the bar-coded ticket 39 for bills at a predefined site in an amusement facility (e.g., a cashier in the casino).

A smart card can be inserted into the card reader 36. The card reader 36 reads the data from the smart card and writes the data onto the smart card. The smart card is carried by the player. The smart card stores the player's identification data and gaming history data.

Figure 3:
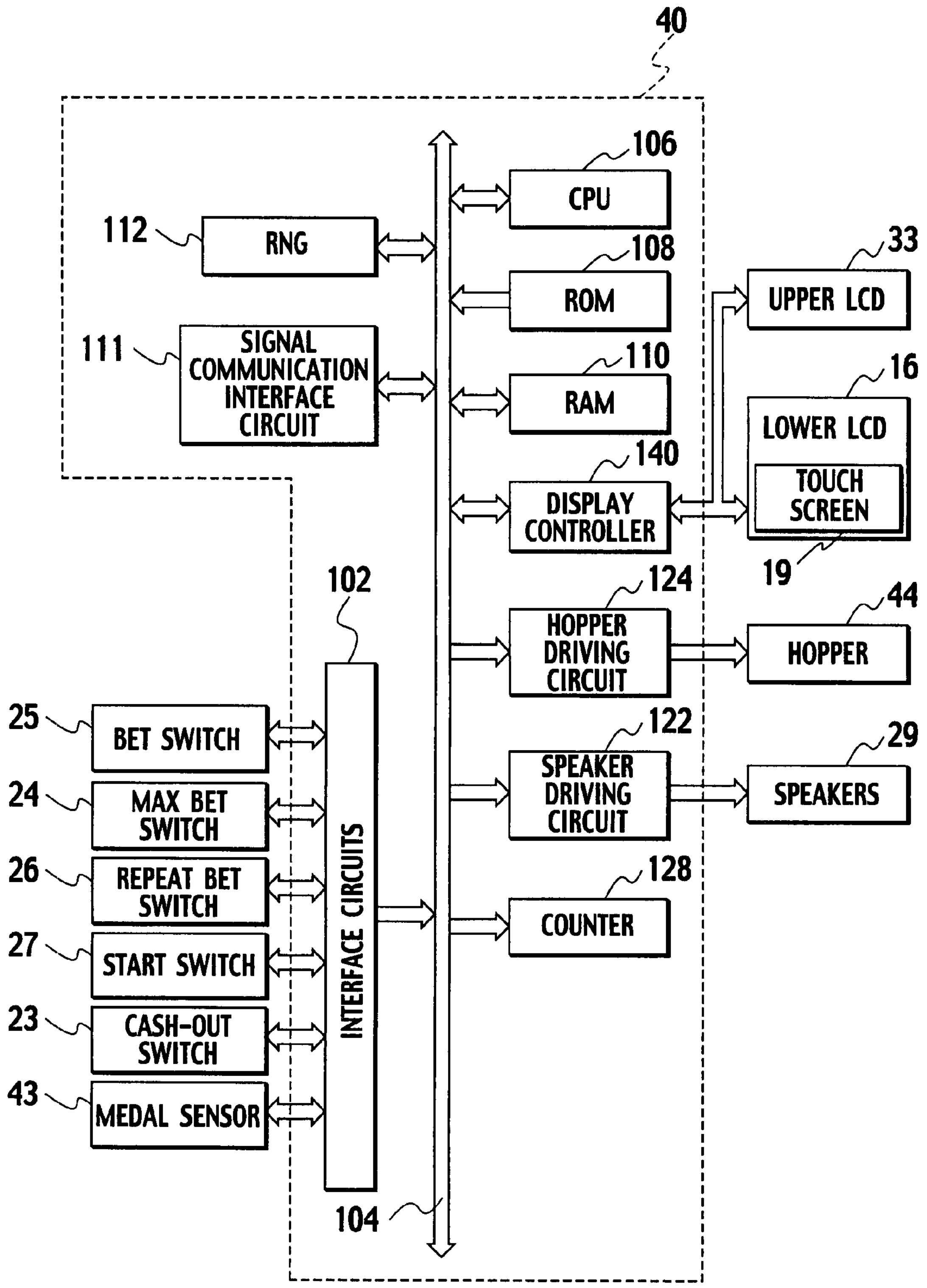
FIG. 3 is a block diagram illustrating a configuration of a control circuit of the slot machine according to one embodiment of the present invention.

FIG. 3 is a block diagram illustrating the electric configuration of the controller 40 and various devices connected to the controller 40, which are provided in the slot machine 10 of the present embodiment. The controller 40 shown in FIG. 3 is a microcomputer. The controller 40 includes interface circuits 102, an I/O bus 104, a CPU 106, a ROM 108, a RAM 110, a signal communication interface circuit 111, a random number generator (RNG) 112, a speaker drive circuit 122, a hopper drive circuit 124, a counter 128, and a display controller 140.

The interface circuits 102 are connected to the I/O bus 104. The I/O bus 104 executes input and output of data signals and address signals with the CPU 106.

The start switch 27 is connected to the interface circuits 102. The start signal output from the start switch 27 is transmitted to the CPU 106 via the I/O bus 104, after having been converted into a predefined signal by the interface circuits 102.

The bet switch 25, the max bet switch 24, the repeat bet switch 26, and the cash-out switch 23 are connected to the interface circuit 102. The switching signal output from each of the switches 23 - 26 is transmitted to the CPU 106 via the I/O bus 104, after having been converted into a predefined signal by the interface circuits 102.

A medal sensor 43 is connected to the interface circuits 102. The medal sensor 43 detects medals, which have been inserted into the medal insertion slot 21. The medal sensor 43 is provided inside the medal insertion slot 21. The detection signal output from the medal sensor 43 is transmitted to the CPU 106 via the I/O bus 104, after having been converted into a predefined signal by the interface circuits 102.

The ROM 108 storing a system program and the RAM 110 storing various data are connected to the I/O bus 104. The RNG 112, the signal communication interface circuit 111, the display controller 140, the hopper drive circuit 124, the speaker drive circuit 122, and the counter 128 are also connected to the I/O bus 104.

The CPU 106, triggered by receiving the start signal from the start switch 27, reads a game execution program and executes a slot game. The game execution program is a program for executing the slot game on the lower LCD 16 through the display controller 140.

In other words, the game execution program is programmed so as to execute a slot game in which the symbols come to a stop after scrolling on respective display areas Q1 to Q3 (see FIG. 2) and a payout will be awarded when a winning combination is formed by the rearranged symbols.

The signal communication interface circuit 111, which is connected to a hall server etc., transmits gaming history data etc. of the slot machine 10 to the hall server. The signal communication interface circuit 111 receives various data transmitted from the hall server. Based on the random number generated by the RNG 112, it is determined whether or not to award a winning combination in the slot game on the lower LCD 16.

The counter 128 has the functions of (i) counting the number of times the unit game is executed (number of slot games executed on the display areas Q1 to Q3=number of executed games), (ii) counting the number of inserted medals during successively executed slot games, and (iii) counting the difference between the number of inserted medals and the number of paid-out medals during successively executed slot games. The "number of inserted medals during successively executed slot games" is an accumulated value of the inserted medals. For example, if the slot game is executed ten times with three medals (credits) bet on each game, the number of inserted medals will be 30. Also, the "difference between the number of inserted medals and the number of paid-out medals during successively executed slot games" is an accumulated value of difference value which is got by subtracting the number of paid-out medals from the inserted medals (in other words, a difference value which is got by subtracting the accumulated number of the paid-out medals from the accumulated number of the inserted medals). For example, if the slot game is executed ten times with three medals (credits) bet on each game, and a payout of ten medals is provided during the ten games, the difference will be 20. The counter 128 can be implemented inside the RAM 110.

The speaker drive circuit 122 outputs audio data to the speakers 29. In other words, the CPU 106 reads the audio data stored in the ROM 108 and transmits the audio data to the speaker drive circuit 122 via the I/O bus 104. In this manner, predefined sound effects are output from the speakers 29.

The hopper drive circuit 124 outputs a cash-out signal to the hopper 44 when providing a cash-out. In other words, the cash-out signal is output by pressing the cash-out switch 23. The CPU 106 outputs, when the cash-out signal is input, a drive signal to the hopper drive circuit 124 via the I/O bus 104. As a result, the hopper 44 cash out medals equivalent to the credits stored in a predefined memory area of the RAM 110 as remaining credits having not been cashed out yet.

The display controller 140 controls display of the slot game executed on the lower LCD 16. In other words, the CPU 106 generates an image display signal according to the progress and outcome of the slot game and outputs the image display signal to the display controller 140 via the I/O bus 104. Upon input of the image display signal, the display controller 140 generates a drive signal of the lower LCD 16 based on the image display signal and outputs it to the lower LCD 16. In this manner, various images such as effect images or explanatory images of the game are displayed on the lower LCD 16.

A touch-screen 19 is provided on the surface of the lower LCD 16. When the player touches the touch-screen 19, the touch position is detected and transmitted as data to the CPU 106.

In addition, the display controller 140 also controls display of various images such as effect images or explanatory images of the game on the upper LCD 33.

Next, the processing procedures according to a first embodiment for executing the unit game on the above-mentioned slot machine 10 will be described, referring to FIGS. 4 to 8.

Figure 4:
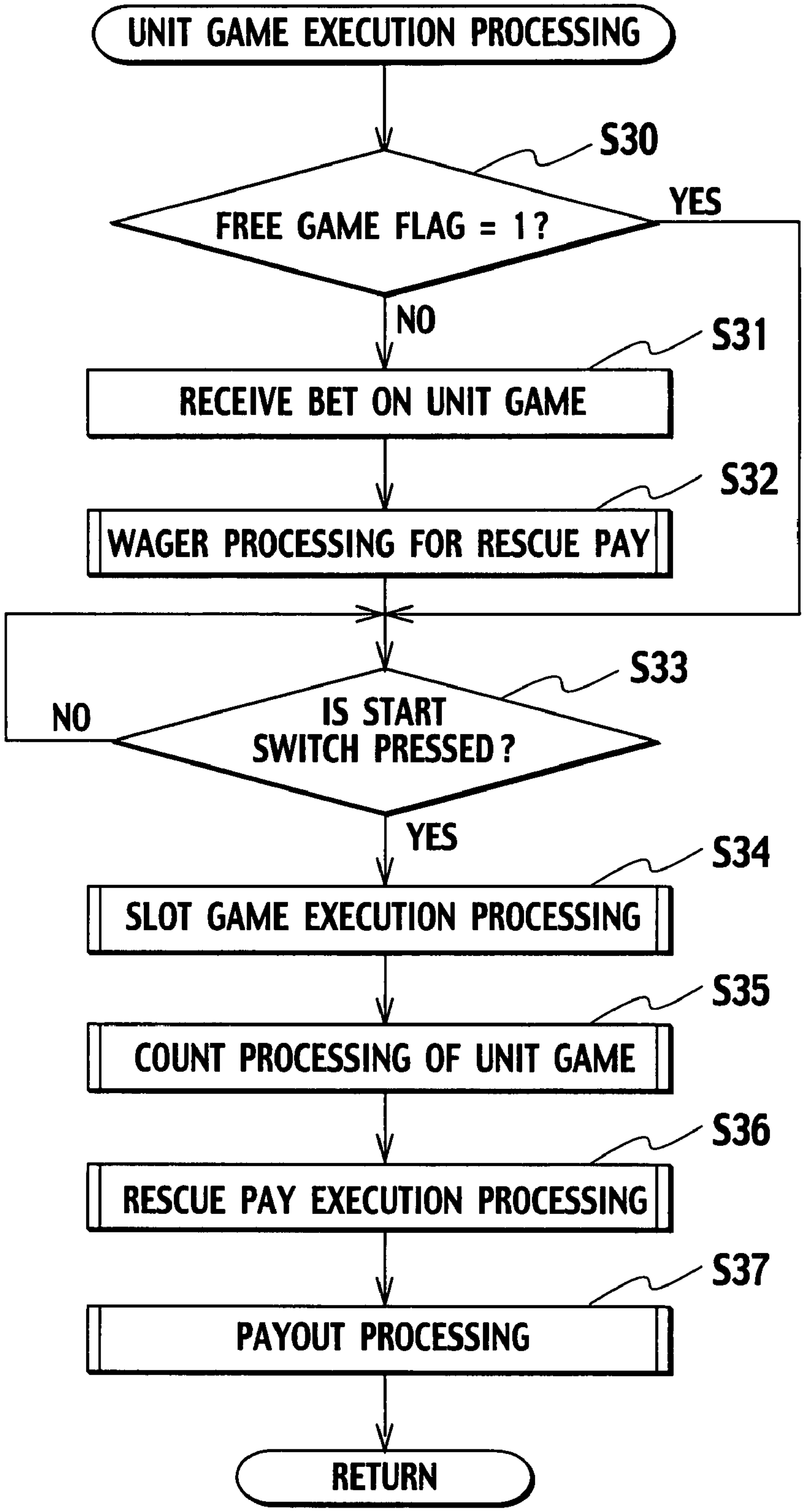
FIG. 4 is a flow chart illustrating the processing procedure according to one embodiment of the present invention.

As shown in FIG. 4, when the unit game is executed, it is determined whether or not a free game flag (described below) is set to "1" (step S30 in FIG. 4). As will be described below, the free game flag is set to "1" during execution of the free game and is reset to "0" while the free game is not being executed. In other words, if the free game flag is not "1" in step S30 (NO in step S30), the free game is not being executed and then the bet on the unit game is received (step S31). Specifically, the insertion of the medal(s) into the medal insertion slot 21 or the pressing-down of the bet switches 24, 25 is detected by the CPU 106.

On the other hand, if the free game flag is "1" (YES in step S30), the free game is being executed and the processing transits from step S30 to step S33.

Next, a wager processing for the rescue pay is executed (step S32). Here, the wager for the rescue pay is received via the touch-screen 19 on the lower LCD 16. The details will be described below, referring to the flow chart shown in FIG. 5.

Subsequently, it is determined whether or not the start switch 27 is pressed (step S33). If the start switch 27 is pressed, the processing proceeds to step S34.

Next, a slot game execution processing is executed (step S34). Here, a processing of rearranging the symbols having been arranged on respective three display areas Q1 to Q3 is executed. The details will be described below referring to the flow chart shown in FIG. 6.

Next, a count processing of the unit game is executed (step S35). In this processing, the count-value of the counter 128 is incremented each time the unit game is executed. The details will be described below, referring to the flow chart of FIG. 7.

Next, a rescue pay execution processing is executed (step S36). In this processing, if a payout equal to or larger than a specified amount (e.g., corresponding to 60 or more medals per one medal) is not provided during a predefined number of executed unit games (e.g., 1000 games), the game transits into free games which do not require wagers. And payouts will be awarded according to outcomes of the free games. The details will be described referring to the flow chart of FIG. 8.

Next, a payout processing is executed (step S37). In this processing, if a winning combination is formed by the rearranged symbols on the three display areas Q1 to Q3, or if the free games are executed as execution of a rescue pay, a payout is provided to the player according to the award of the winning combination or the rescue pay. Subsequently, the processing proceeds to the next unit game.

Figure 5:
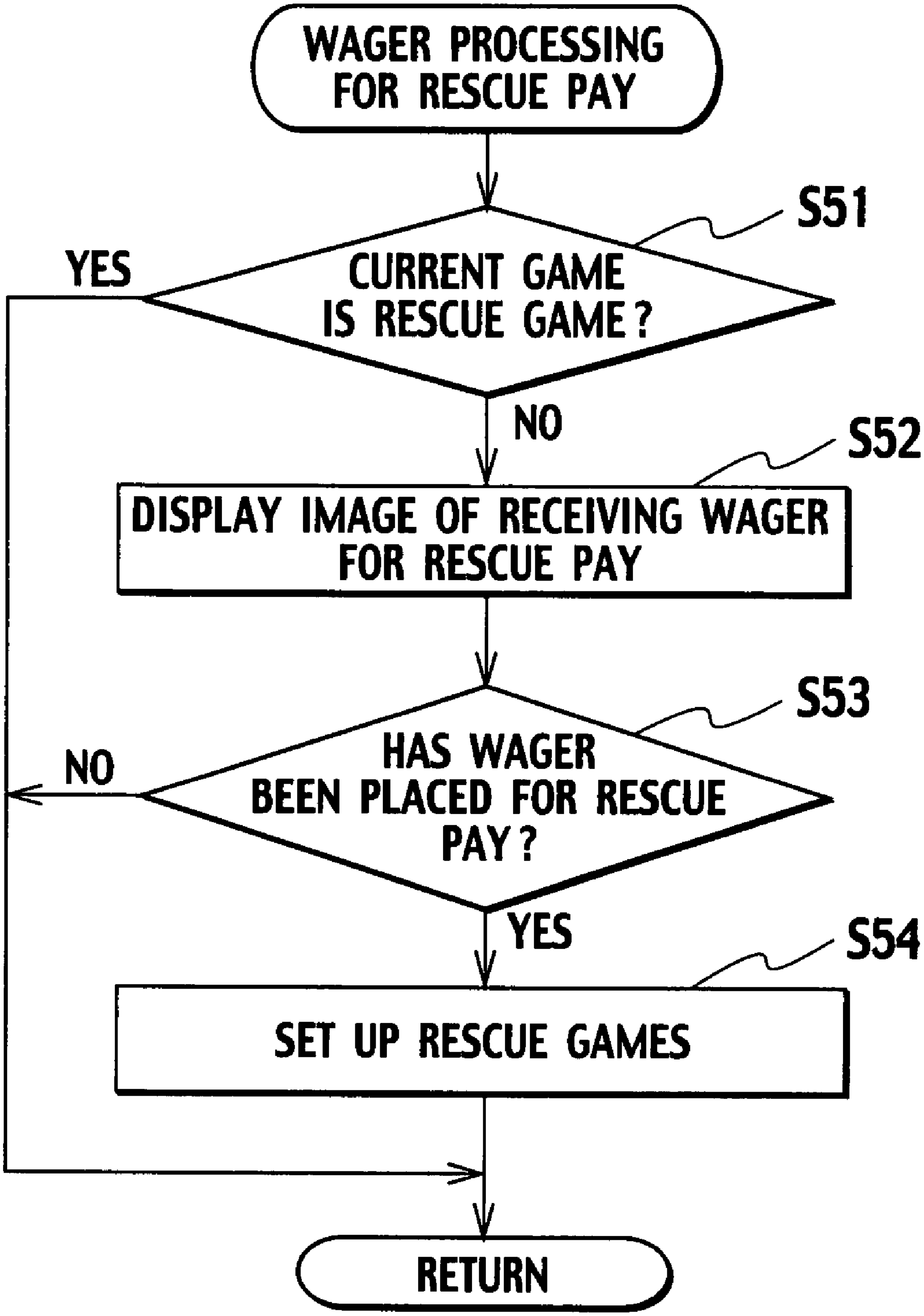
FIG. 5 is a flow chart illustrating the processing procedure according to one embodiment of the present invention.

FIG. 5 shows a flow chart of the wager processing for the rescue pay in step S32 of FIG. 4. First, it is determined whether or not the current unit game is a rescue game (step S51). Then, if the current unit game is not the rescue game (NO in step S51), the processing proceeds to step S52. On the other hand, if the current unit game is a rescue game (YES in step S51), the processing is completed.

If the determination of step S51 is negative, an image notifying acceptance of the wager for the rescue pay is displayed on the upper LCD 33 and the lower LCD 16 (step S52).

Figure 19A:
FIG. 19A is an exemplary display displayed on an LCD of the slot machine according to one embodiment of the present invention.
Figure 19B:
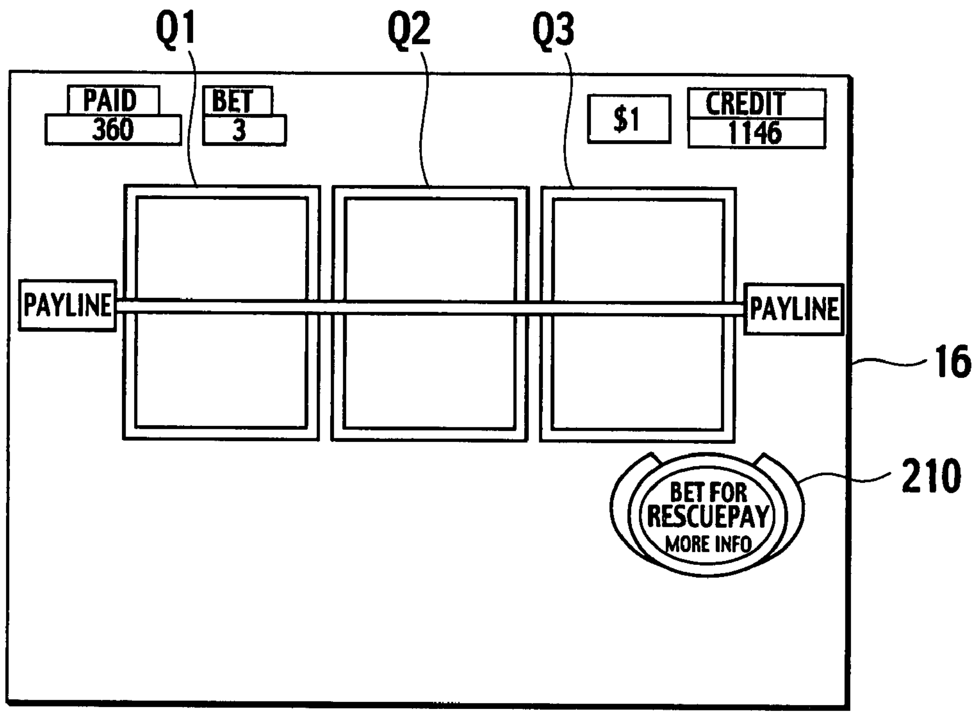
FIG. 19B is an exemplary display displayed on an LCD of the slot machine according to one embodiment of the present invention.

FIG. 19A shows the exemplary image displayed on the upper LCD 33. FIG. 19B shows the exemplary image displayed on the lower LCD 16. In FIG. 19A, a "RESCUE OFF" image 200 is displayed indicating a state that a wager for the rescue pay has not currently been placed. Additionally, in FIG. 19B, a button 210 for presenting explanation of the rescue pay is displayed. When the player touches the button 210, the touch operation is detected by the touch-screen 19 (see FIG. 3).

Figure 20:
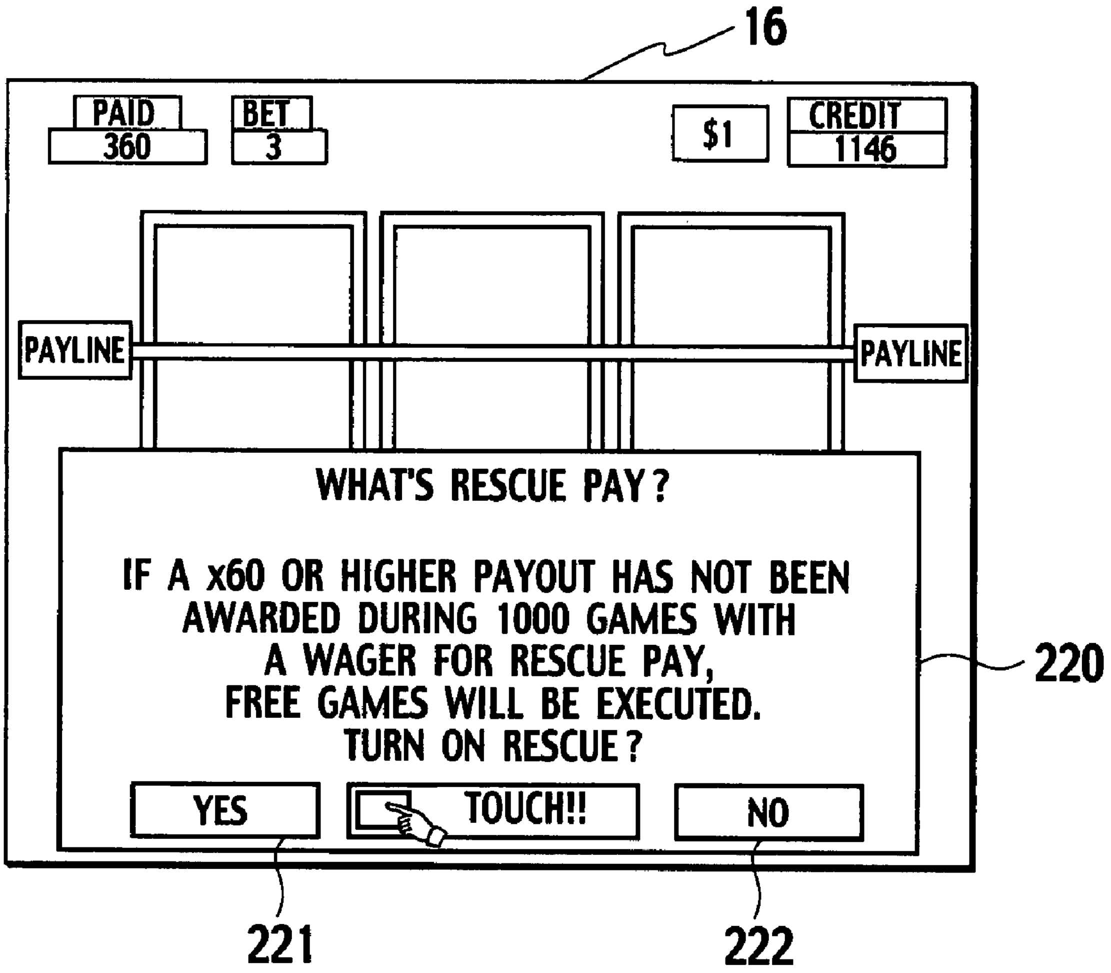
FIG. 20 is an exemplary display displayed on an LCD of the slot machine according to one embodiment of the present invention.

Subsequently, as shown in FIG. 20, an explanatory image 220 of the rescue pay is displayed. In this example, a statement "What's rescue pay? If a ×60 or higher payout has not been awarded during 1000 games with a wager for rescue pay, free games will be executed. Turn on rescue?" is displayed. In this manner, the player is informed of the content of the rescue pay and prompted to select either one of selection images 221 and 222 indicating "YES" or "NO".

Figure 21A:
FIG. 21A is an exemplary display displayed on an LCD of the slot machine according to one embodiment of the present invention.
Figure 21B:
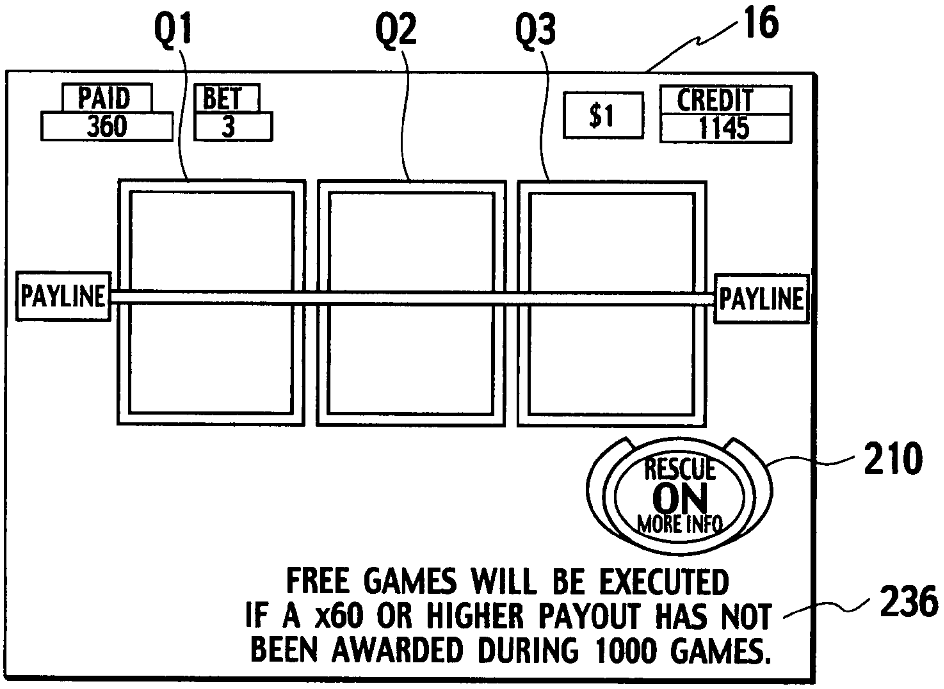
FIG. 21B is an exemplary display displayed on an LCD of the slot machine according to one embodiment of the present invention.

Then, a "RESCUE ON" image 230 is displayed on the upper LCD 33 as shown in FIG. 21A, if a wager for the rescue pay is placed by the player's selection of the "YES" image 221 and the wager for the rescue pay is placed during a predefined period after the selection. Additionally, as shown in FIG. 21B, a statement 236 "The free games will be executed if a ×60 or higher payout has not been awarded during 1000 games." is displayed on the lower LCD 16 in order to notify the player that the current unit game is a rescue game.

Next, it is determined whether or not the wager for the rescue pay has been placed (step S53). If the wager for the rescue pay has not been placed (NO in step S53), the processing is completed. On the other hand, if the wager for the rescue pay has been placed (YES in step S53), the processing proceeds to step S54.

Figure 6:
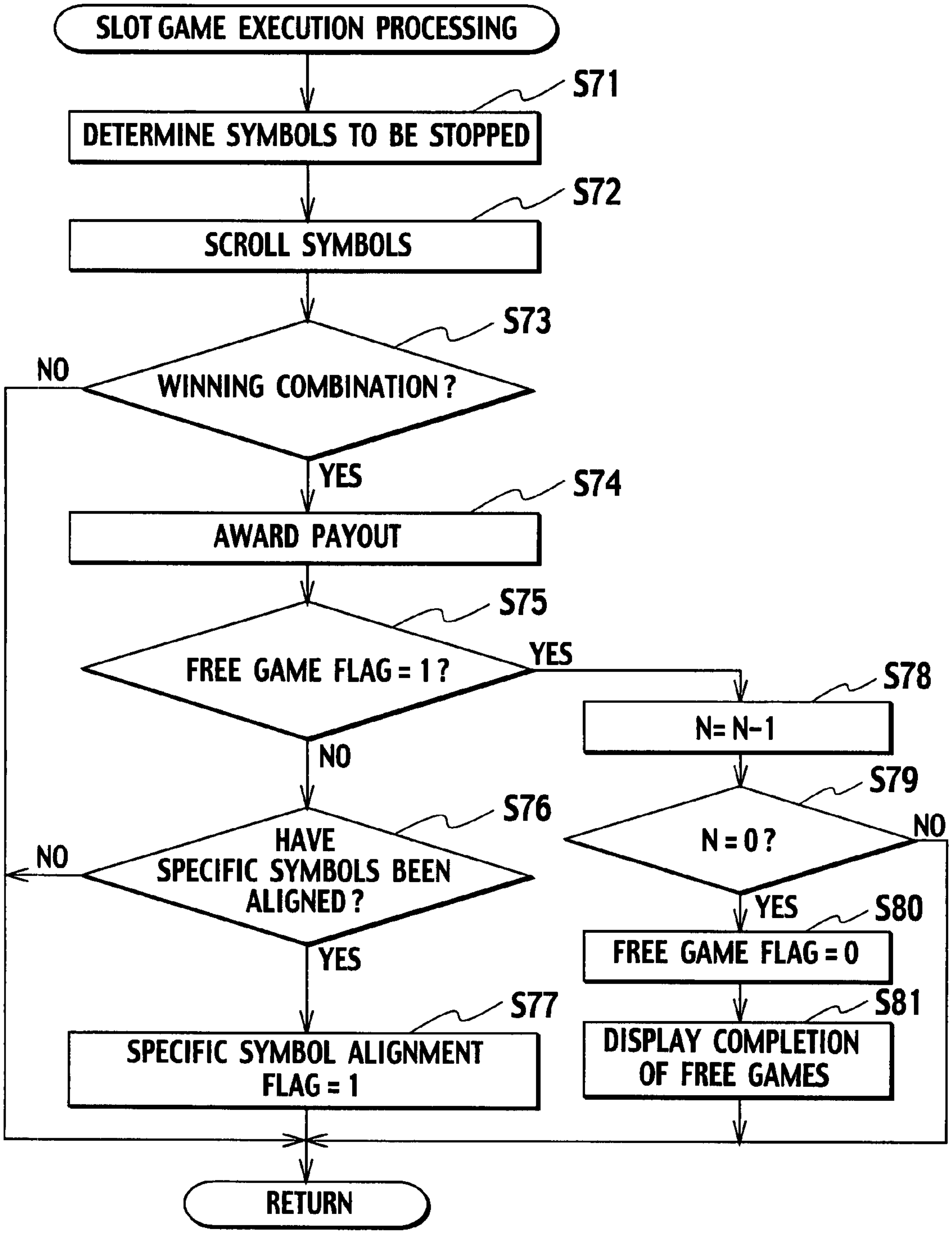
FIG. 6 is a flow chart illustrating the processing procedure according to one embodiment of the present invention.

FIG. 6 shows a flow chart of the execution processing of the slot game in step S34 of FIG. 4. In the following, the execution processing of the slot game will be described in detail with reference to the FIG. 6.

First, the symbols to be stopped on each of the display areas Q1 to Q3 are determined based on the random number generated by the RNG 112 (see FIG. 3) (step S71). Subsequently, the symbols are scrolled on each of the display areas Q1 to Q3, and the scrolling symbols (=the continuously-and-variably displayed symbols) are stopped after a predefined time period (e.g., five seconds) has elapsed (step S72). Here, the stopped symbols have been determined in step S71. Subsequently, the processing proceeds to step S73.

It is determined whether or not a winning combination awarding a payout has been formed on the display areas Q1 to Q3 (step S73). The winning combinations are defined in the payout table shown in FIG. 18. Specifically, each of the payouts is predefined, such as: (i) if three "DOUBLE" symbols are in alignment across the display areas Q1 to Q3, a payout equivalent to 800 medals is awarded per one medal; (ii) if three "triple BAR" symbols are in alignment across the display areas Q1 to Q3, a payout equivalent to 60 medals is awarded per one medal. Additionally, (iii) if three "double BAR" symbols are in alignment, (iv) if three "CHERRY" symbols are in alignment, (v) if three "single BAR" symbols are in alignment, (vi) if three of any of "triple BAR" symbols, "double BAR" symbols, and "single BAR" symbols are in alignment; (vii) if two "CHERRY" symbols are in alignment, or (viii) if one "CHERRY" symbol has appeared, predefined payouts are awarded respectively.

Subsequently, a processing for providing a payout is executed according to the above-mentioned winning combination (step S74). It is determined whether or not the free game flag is "1" (step S75). In other words, it is determined whether or not the free games (=execution of the rescue pay) are being executed based on the free game flag.

Figure 18:
FIG. 18 is a payout table illustrating the relationship between a winning combination and a payout of the slot machine according to one embodiment of the present invention.
Figure 18:
Figure 18:
Figure 18:

If the determination of step S75 is negative, the free games (=execution of the rescue pay) are not being executed. In this case, the processing transits from step S75 to step S76. Then, it is determined whether or not specific symbols have been aligned across the display areas Q1 to Q3 (step S76). In the present embodiment, the specific symbols are the symbols that constitute a winning combination to award a ×60 or higher payout. Thus, as shown in FIG. 18, it is determined that the specific symbols are in alignment when three "DOUBLE" symbols or three "triple BAR" symbols are in alignment.

Then, if it is determined that the specific symbols are in alignment (YES in step S76), the specific symbol alignment flag is set to "1" (step S77). Subsequently, the processing is completed.

In the execution processing of the slot game shown in FIG. 6, a payout for is provided according to a winning combination when the free games are not under execution and the winning combination has been rearranged. Furthermore, when specific symbols (three "DOUBLE" symbols or three "triple BAR" symbols in the present embodiment) which award a larger profit to the player are in alignment, a payout is provided according to the specific symbol and also the specific symbol alignment flag is set to "1".

On the other hand, if the determination of step S75 is affirmative, the free games (=execution of the rescue pay) are being executed. In this case, the processing transits from step S75 to step S78. Then, the remaining number of free games N (described below) is reduced by one [N=N−1] (step S78). Furthermore, it is determined whether or not N=0 (step S79). If the determination of step S79 is affirmative, it means that the free games has already been executed the predetermined number of times, which is determined in the rescue pay execution processing described below. In this case, the processing transits from step S79 to step S80. Then, the free game flag is reset to "0" (step S80). Furthermore, it is displayed on the upper LCD 33 that the free games has been completed (step S81). Subsequently, the processing returns to the processing procedure of FIG. 4. As thus described, in the slot game under the free games (YES in step S75), the processing of the specific symbol alignment flag is not executed if the free game flag ="1" in step S75. In other words, during the free games, wager-free slot games are repeated the number of times n (described below: n is determined for the rescue pay), regardless of whether or not the specific symbols are in alignment.

The free game flag is maintained to "1" until the free games have been executed n times (n is determined when the game transits into the free game). In this case, step S30 of FIG. 4 is affirmed and reception of the bet on the unit game in step S31 is not executed. As a result, a wager-free slot game (free game) is executed n times.

Figure 7:
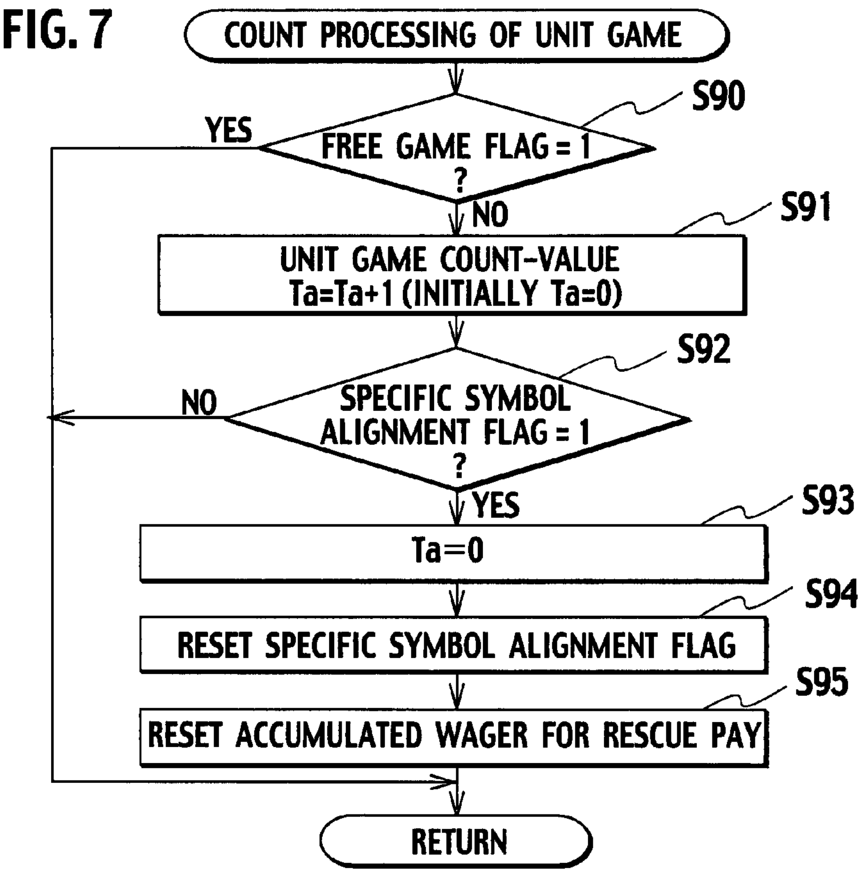
FIG. 7 is a flow chart illustrating the processing procedure according to one embodiment of the present invention.

Next, the count processing of the unit game shown in step S35 of FIG. 4 will be described with reference to the flow chart shown in FIG. 7.

First, it is determined whether or not the free game flag is "1" (step S90). If the free game flag is "1", the free games are being executed. In this case, the processing is completed and returns to the processing procedure of FIG. 4. On the other hand, if the free game flag is not "1", the free games are not being executed. In this case, the processing proceeds to step S91. Then, the count-value Ta of the unit game is incremented [Ta=Ta+1] (step S91). Here, the initial value (when the slot machine 10 is powered on) of the count-value Ta is zero. In addition, the count-value Ta is reset in step S93 described below. Note that the count-value Ta is a value for counting the number of executed unit games. Upon completion of step S91, the processing proceeds to step S92.

Next, it is determined whether or not the specific symbol alignment flag is "1" (step S92). In other words, it is determined whether or not the specific symbol alignment flag of step S76 of FIG. 6 is "1". If the specific symbol alignment flag is "1" (YES in step S92), the count-value Ta is reset (step S93).

Furthermore, the specific symbol alignment flag is also reset (step S94). Then, the wager for the rescue pay is also reset (step S95). In other words, if a payout of ×60 or higher is awarded (that is, if the specific symbol alignment flag is "1") (YES in step S92), both the count-value Ta of the unit game and the wager for the rescue pay in step S32 of FIG. 4 are reset.

On the other hand, if the specific symbol alignment flag is not "1" (NO in step 92), the processing is completed. In other words, if the specific symbol alignment flag is not "1" (NO in step S92), the processing is completed and proceeds to the next unit game after the count-value Ta is incremented.

In the above-mentioned count processing of the unit game, if a winning combination with a ×60 or higher payout is not awarded (specific symbols are not aligned), the count-value Ta is incremented. On the other hand, if a winning combination with a ×60 or higher payout is awarded (the specific symbols are in alignment), the count-value Ta is reset. In this manner, the number of successive unit games in which any specific symbols have not been aligned is counted.

Next, the rescue pay execution processing of step S36 of FIG. 4 will be described in detail with reference to the flow chart shown in FIG. 8. First, it is determined whether or not the current unit game is a rescue game (step S101). If the current unit game is a rescue game (YES in step S101), the processing proceeds to step S102. On the other hand, if the current unit game is not a rescue game (NO in step S101), the processing is completed.

If the determination of step S101 is affirmative, it is determined whether or not the count-value Ta is equal to a preset upper limit (predefined value) Tamax (e.g., Tamax=1000) (step S102). Then, if Ta=Tamax (YES in step S102), the processing proceeds to step S103. On the other hand, if not Ta=Tamax (NO in step S102), the processing is completed.

In steps S103 to S105, a processing to execute a rescue pay (processing of transition to a free game) is executed. In other words, if the specific symbols have not been aligned although the number of executed games (=the count-value Ta) reaches the upper limit Tamax (YES in step S102), the free game flag is set to "1" (step S103). Here, "the specific symbols are not aligned" means that a winning combination with a ×60 or higher payout is not awarded, specifically. Subsequently, the number of execution times n of the free game is randomly determined (step S104). The determined number of times n is stored in the RAM 110 (FIG. 3).

Then, the number of execution times n determined in step S104 is set as the remaining number of times N of the free games (step S105). The number of times N is also stored in the RAM 110 (FIG. 3). After the number of execution times N is set, the processing returns to the processing procedure of FIG. 4.

Figure 8:
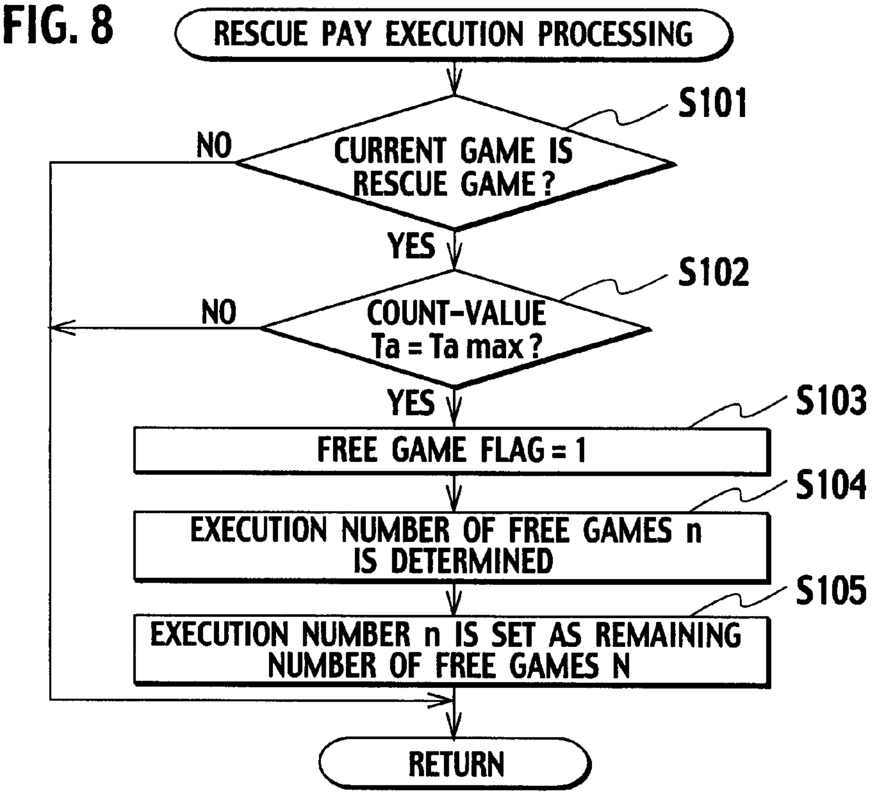
FIG. 8 is a flow chart illustrating the processing procedure according to one embodiment of the present invention.

In the rescue pay execution processing of FIG. 8, the transition into the free games (=execution of the rescue pay) is determined, when the alignment of the specific symbols has not been achieved during the predefined number (Tamax=1000) of the unit games which are set as the rescue games (=the wager for the rescue pay has been placed).

If the free game flag is set to "1" in this processing, the wager-free unit game are executed n times (n has been determined in step S104). Then the payout processing (step S37 of FIG. 4) is executed according to the outcomes of the unit games which has been executed n times.

In other words, the number of execution times n of the free games is randomly determined when the game transits into the free game. And the payout amount in the free games varies since the outcomes of the free games are not constant. Therefore, the free games (=the rescue pay) of the slot machine 10 of the present embodiment can provide further gaming entertainment in itself.

Note that, the free game flag, the specific symbol alignment flag, the count-value Ta of the unit games, the number of execution times n of the free games, and the remaining number of times N are stored in the RAM 110 (FIG. 3).

Figure 22A:
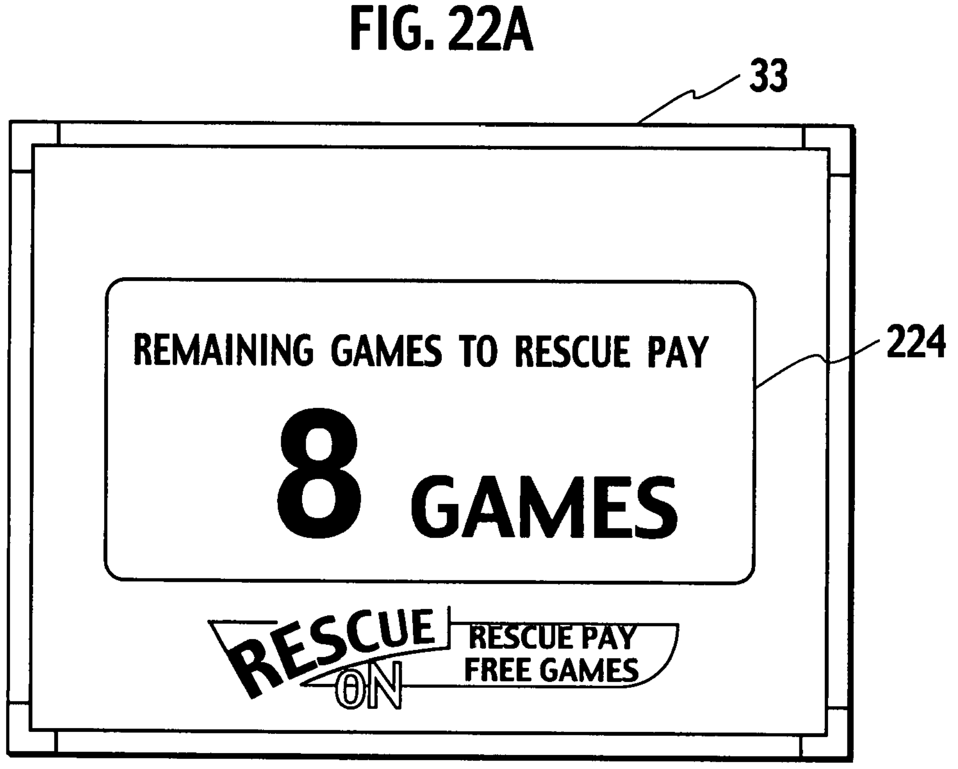
FIG. 22A is an exemplary display displayed on an LCD of the slot machine according to one embodiment of the present invention.
Figure 22B:
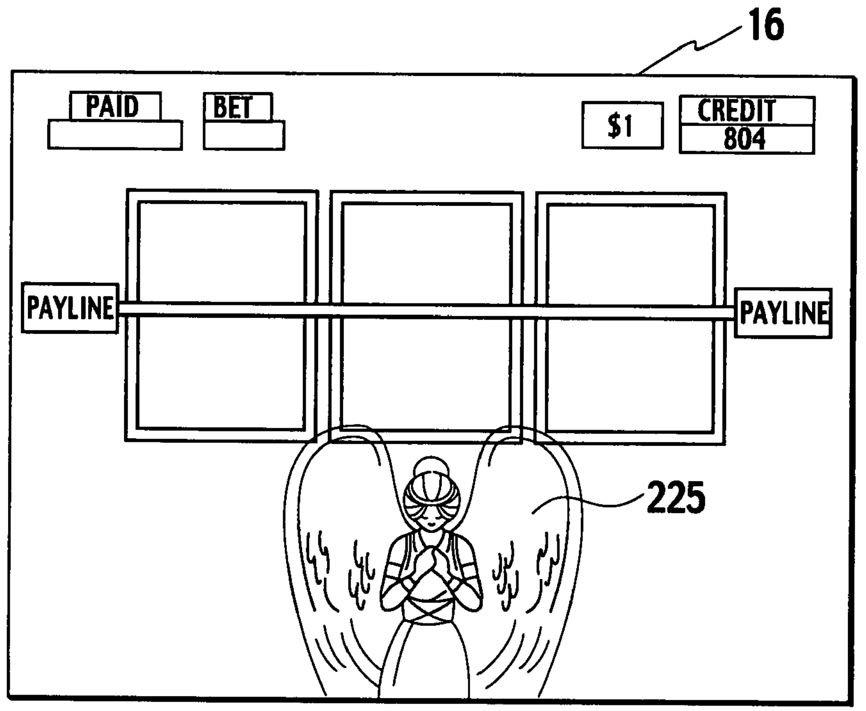
FIG. 22B is an exemplary display displayed on an LCD of the slot machine according to one embodiment of the present invention.

FIG. 22A is an exemplary display of an image displayed on the upper LCD 33 when the count-value Ta is going to reach the upper limit Tamax. FIG. 22B is an exemplary display of an image displayed on the lower LCD 16. When the count-value Ta is "992", an image 224 is displayed on the upper LCD 33 in order to notify the player that eight games are left until a rescue pay is provided. In addition, an image 225 of an angel with folded wings is also displayed on the lower LCD 16.

Figure 23A:
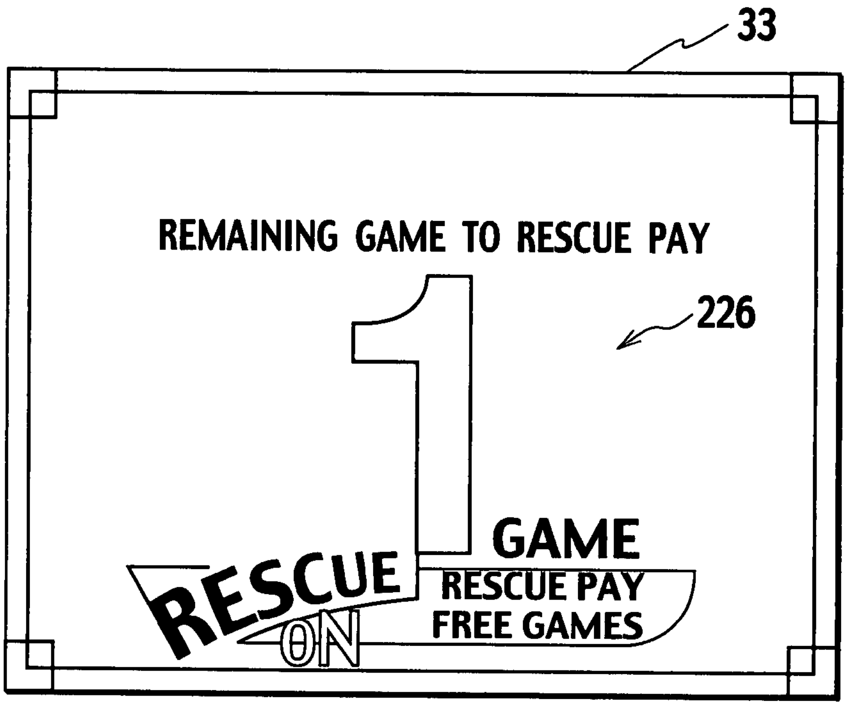
FIG. 23A is an exemplary display displayed on an LCD of the slot machine according to one embodiment of the present invention.
Figure 23B:
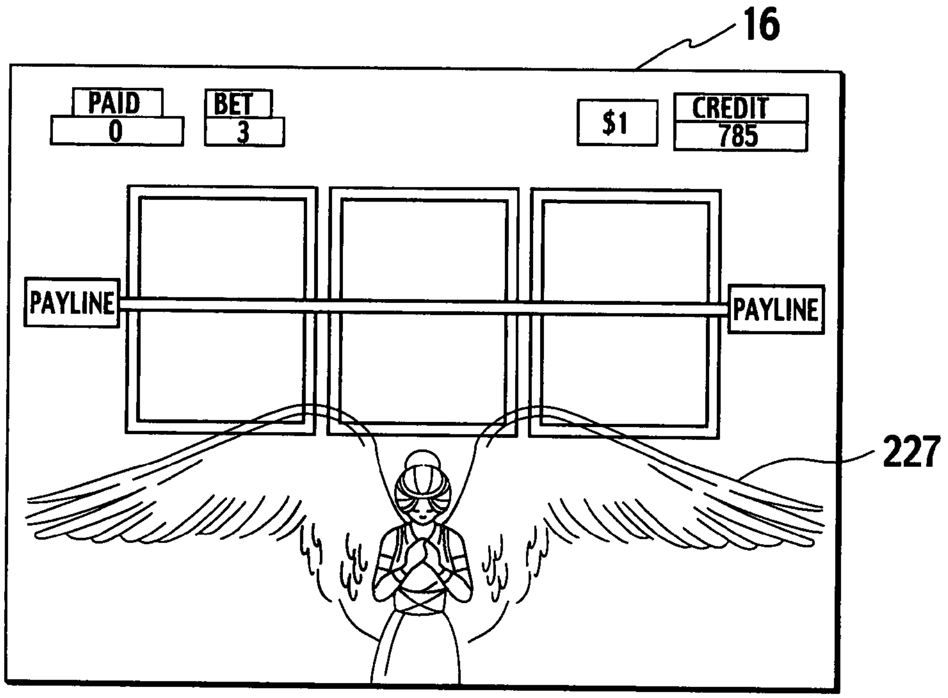
FIG. 23B is an exemplary display displayed on an LCD of the slot machine according to one embodiment of the present invention.

FIG. 23A is an exemplary display of an image displayed on the upper LCD 33 when the count-value Ta is "999". FIG. 23B is an exemplary display of an image displayed on the lower LCD 16. An image 226 is displayed on the upper LCD 33 in order to notify the player that one game is left until a progressive bonus (rescue pay) is provided. In addition, an image 227 of an angel with spread wings is also displayed on the lower LCD 16.

Figure 24A:
FIG. 24A is an exemplary display displayed on an LCD of the slot machine according to one embodiment of the present invention.
Figure 24B:
FIG. 24B is an exemplary display displayed on an LCD of the slot machine according to one embodiment of the present invention.

FIG. 24A is an exemplary display of an image displayed on the upper LCD 33 when the count-value Ta has reached the upper limit Tamax="1000". FIG. 24B is an exemplary display of an image displayed on the lower LCD 16. Images 316 and 252 are displayed on the upper LCD 33 and the lower LCD 16 respectively in order to notify that the game has transited into the free games (=execution of the rescue pay).

Figure 25:
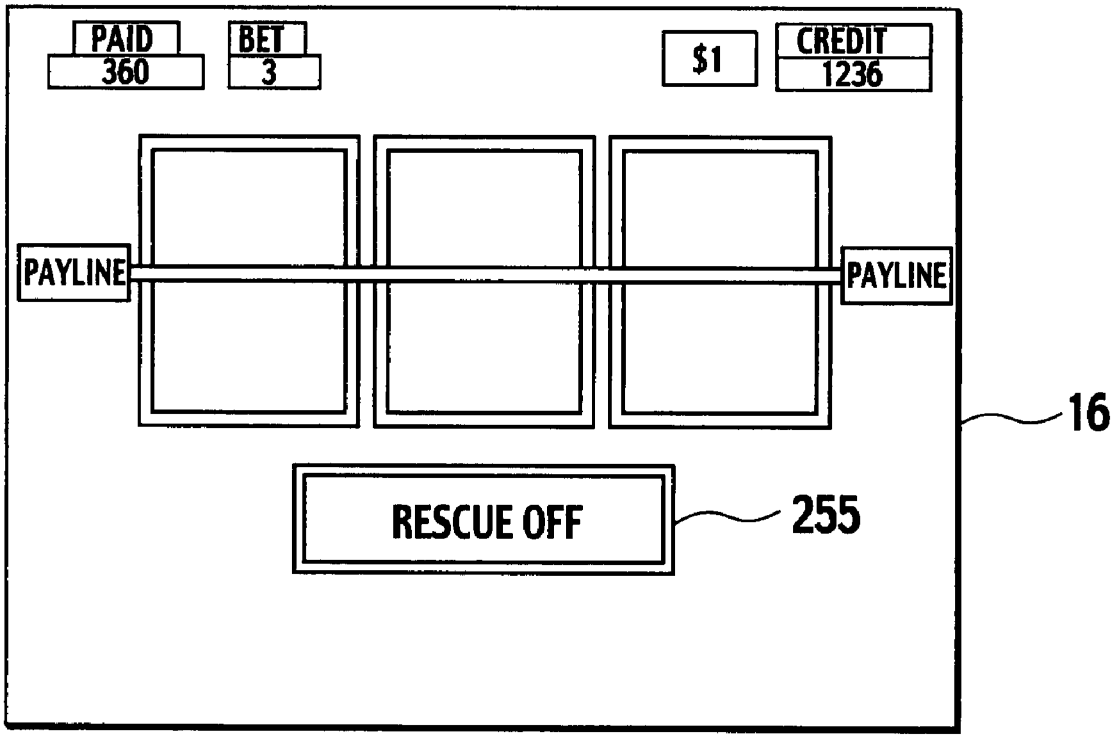
FIG. 25 is an exemplary display displayed on an LCD of the slot machine according to one embodiment of the present invention.

FIG. 25 is an example of an image displayed on the lower LCD 16 after the n times free games have been finished (see step S81 in FIG. 6). An image 255 is displayed on the lower LCD 16 in order to notify that the rescue pay is deactivated as a result of awarding the rescue pay.

In this manner, the rescue pay is executed in steps S103 to S105 of FIG. 8.

In the payout processing of step S37 of FIG. 4, medals or coins are cashed out from the cash-out opening 28 (see FIG. 2), according to the processing of step S74 in FIG. 6 (FIG. 6 shows the processing of step S34 in FIG. 4 in detail). The payout may be provided by credits, in which case the credit counter of the slot machine is counted up. Subsequently the processing is completed. The payout amount is stored in the RAM 110 (FIG. 3) in step S74. The CPU 106 reads the stored payout amount, and executes the payout processing. The payout amount of step S74 depends on the winning combination in each unit game. When the unit game is the free game, the payout of step S74 is the payout of the free game (=the rescue pay). On the other hand, when the unit game is not the free game, the payout of step S74 is the payout of the normal unit game which is not the free game.

As thus described, with the slot machine 10 of the present embodiment, transition into the free games for the rescue pay is executed when the count-value Ta reaches the upper limit (predefined value) Tamax during the rescue games. Then, the payouts are provided to the player according to the outcomes of the n times free games (n is randomly determined).

Furthermore, the payout is cashed out from the cash-out opening 28 with coins or medals when the rescue pay is provided. As a result, satisfying feeling is given to the player when the rescue pay is provided.

As thus described, with the slot machine 10, free games are executed if the unit game, which doesn't give a profitable specific outcome to the player, has been executed successively for a predefined number of times. Then an insurance pay is provided to the player according to the outcomes of the free games.

Figure 9:
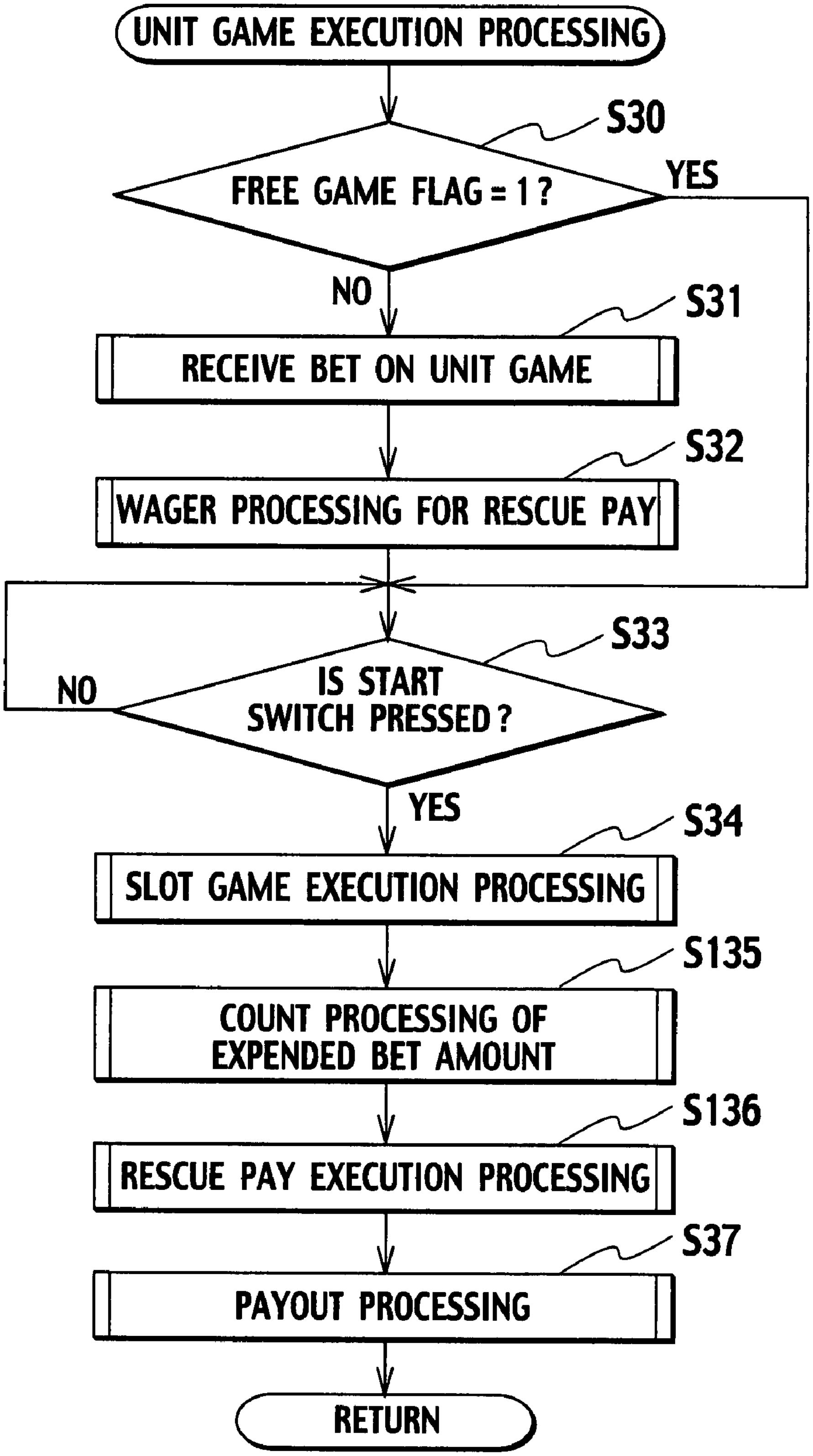
FIG. 9 is a flow chart illustrating the processing procedure according to one embodiment of the present invention.

Next, the second embodiment of the present invention will be described. FIG. 9 is a flow chart illustrating the processing procedure of the unit game executed on a slot machine (gaming machine) 10 according to the second embodiment. Comparing the unit game execution processing of FIG. 9 (the present embodiment) with the unit game execution processing of FIG. 4 (the first embodiment), step S135 of FIG. 9 (count processing of the expended bet amount) differs from step S35 of FIG. 4 (count processing of the unit game). In addition, steps S136 and S36 are different. In step S136, a rescue pay (free games) is executed based on the count-value Tb of the expended bet amount. Other processing steps of FIG. 9 are similar to steps S30 to S34 and step S37 of FIG. 4. Therefore, the steps of FIG. 9 corresponding to the steps of FIG. 4 are given same numerals, and then duplicate descriptions are omitted.

Figure 10:
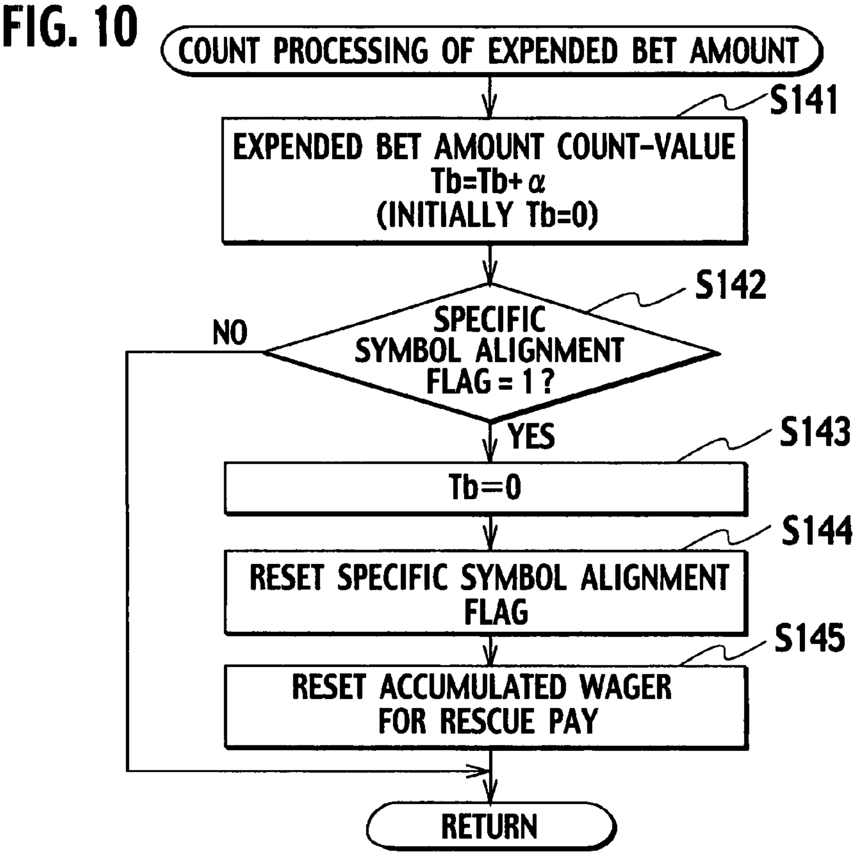
FIG. 10 is a flow chart illustrating the processing procedure according to one embodiment of the present invention.

In the following, the count processing of the expended bet amount of step S135 of FIG. 9 is described with reference to the flow chart shown in FIG. 10.

First, a newly placed bet amount α is added to the count-value Tb of the current expended bet amount (accumulation of the expended bet amount) [Tb=Tb+α] (step S141). Here, the initial value (when the slot machine 10 is powered on) of the count-value Tb is zero. In addition, the count-value Tb is reset in step S143 described below. Note that the count-value Tb is an accumulated value of the bet amount (number of medals or wager amount) placed on successive unit games. If three medals are bet on a unit game, for example, it results in α=3 and a count-value of Tb=Tb+3. Upon completion of step S141, the processing proceeds to step S142.

Next, it is determined whether or not the specific symbol alignment flag is "1" (step S142). In other words, it is determined whether or not the specific symbol alignment flag of step S77 of FIG. 6 is "1". If the specific symbol alignment flag is "1" (YES in step S142), the count-value Tb is reset (step S143).

Furthermore, the specific symbol alignment flag is also reset (step S144). Then, the wager for the rescue pay is also reset (step S145). In other words, if a payout of ×60 or higher is awarded, both the count-value Tb of the expended bet amount and the wager for the rescue pay in step S32 of FIG. 9 are reset.

On the other hand, if it is determined that the specific symbol alignment flag is not "1" (NO in step 142), the processing is completed. In other words, if the specific symbol alignment flag is not "1"(NO in step 142), the processing is completed and proceeds to the next unit game after the count-value Tb is counted (accumulated).

In the above-mentioned count processing, if a winning combination with a ×60 or higher payout is not awarded (specific symbols are not aligned), a newly placed bet amount a (e.g., α=3) is added to the count-value Tb. In this manner, the expended bet amount during successive unit games in which any specific symbols have not been aligned is counted. Additionally, if a winning combination with a ×60 or higher payout is awarded (specific symbols are in alignment), the count-value Tb is reset.

Figure 11:
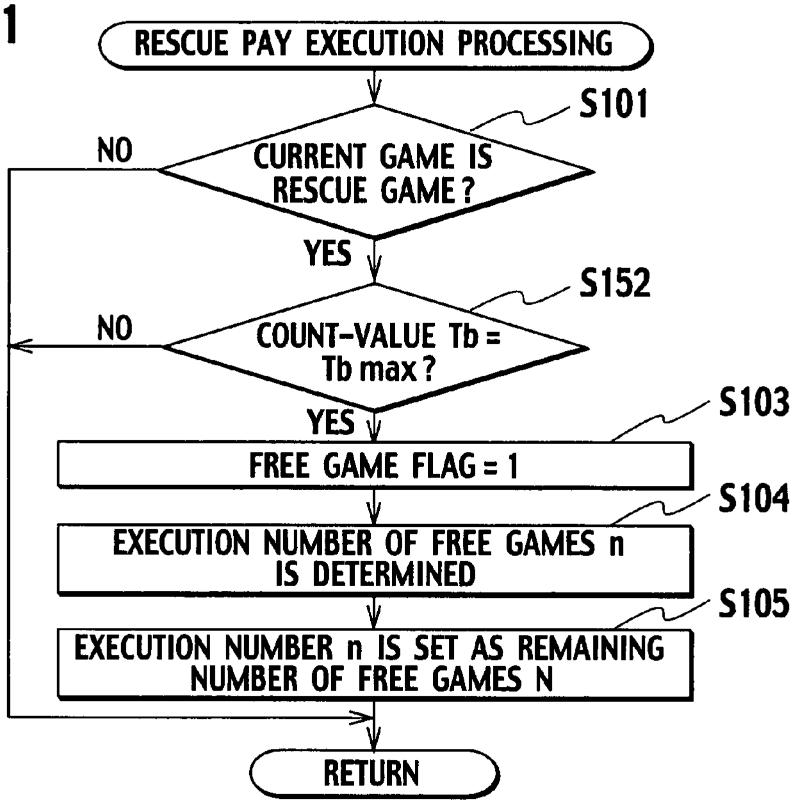
FIG. 11 is a flow chart illustrating the processing procedure according to one embodiment of the present invention.

FIG. 11 shows the rescue pay execution processing (step S136 of FIG. 9) in detail. The steps of FIG. 11 corresponding to the steps of FIG. 8 are given same numerals, and then duplicate descriptions are omitted.

It is determined whether or not the count-value Tb of the expended bet amount is equal to a preset upper limit Tbmax (step S152 in FIG. 11). Then Tb=Tbmax (YES in step S152), the processing proceeds to step S103. And then, the free game flag is set to "1" (step S103) and the game transits into the free games as the rescue pay.

As thus described, in the execution processing of the unit game of FIG. 9, the expended bet amount is counted in the expended bet amount count processing (step S135). Then, the execution of the rescue pay is activated and the game transits into the free games when the count-value Tb reaches the preset upper limit Tbmax. In other words, if the specific symbols have not been aligned although the expended bet amount reaches the upper limit Tbmax, the execution of the rescue pay is activated and the game transits into the free games. Here, "the specific symbols are not aligned" means that a winning combination with a ×60 or higher payout is not awarded, specifically.

With the slot machine (gaming machine) according to the second embodiment of the present invention, as described above, the execution of the rescue pay is activated and the game transits into the free games when the count-value Tb (accumulation of the expended bet amount) reaches the upper limit Tbmax during the rescue games.

Additionally, with the second embodiment, a newly placed bet amount a on the unit game is added to the count-value Tb. However, it may be arranged such that a difference between a bet amount on a unit game and a payout amount for the unit game is added to the count-value Tb. In this case, the following processing is done instead of the processing of step S141 in FIG. 10. The difference X-Y between the newly placed bet amount X for the unit game and the payout amount (amount of the award) Y for the unit game maybe calculated. And then, the calculated difference X-Y is added to the previous calculations Z of the difference X-Y to update. In other words, Z=(X-Y)+Z is calculated. Then, in step S152 of FIG. 11, it is determined whether or not Z has reached a predefined upper limit Zmax (Z =Zmax). If the calculation result Z has reached the upper limit Zmax, the free game flag is set to "1" in step S103 and the execution of the rescue pay is activated. In this case, substantial loss of the player is counted.

Additionally, the first embodiment is an example wherein the rescue pay is provided when the count-value Ta of the number of the executed unit games reaches the upper limit Tamax. Also, the second embodiment is an example wherein the rescue pay is provided when the count-value Tb of the expended bet amount during successive unit games reaches the upper limit Tbmax. It may be arranged such that the rescue pay is awarded using the combination of these.

In other words, the rescue pay is provided to the player if either one of the following cases is achieved: when the count-value Ta reaches the upper limit Tamax; or when the count-value Tb reaches the upper limit Tbmax.

Figure 12:
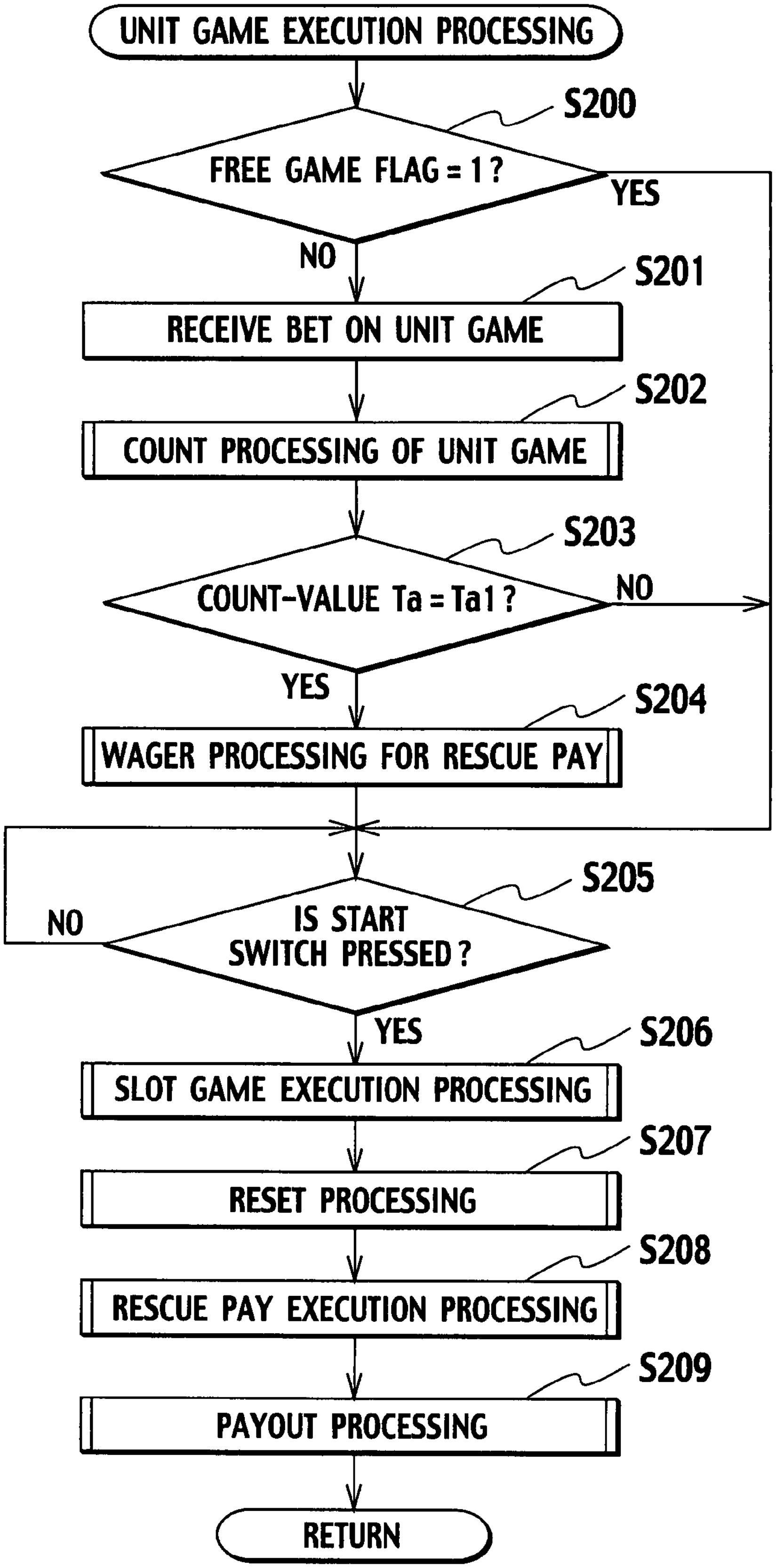
FIG. 12 is a flow chart illustrating the processing procedure according to one embodiment of the present invention.

Next, a slot machine (gaming machine) 10 of the third embodiment of the present invention 10 will be described. FIG. 12 is a flow chart illustrating the procedure of the unit game execution processing in the slot machine 10 according to the third embodiment. After starting a unit game, it is determined whether or not the free game flag is set to "1" (step S200). If the free game flag is "1" (YES in step S200), the processing proceeds to step S205. On the other hand, if the free game flag is riot "1" (NO in step S200), the processing proceeds to step S201.

A bet on the unit game is received (step S201). Specifically, the insertion of the medal(s) into the medal insertion slot 21 or the pressing-down of the bet switches 24, 25 is detected by the CPU 106.

Next, a count processing of the unit game is executed (step S202). The count processing of the unit game will be described below, referring to the flow chart shown in FIG. 13. Subsequently, it is determined whether or not the count-value Ta reaches a preset criterion value Ta1 (e.g., Ta1=100) (step S203). Then, if the count-value Ta reaches the criterion value Ta1 (YES in step S203), the processing proceeds to step S204. On the other hand, if the count-value Ta does not reach the criterion value Ta1 (NO in step S203), the processing proceeds to step S205.

If the determination of step S203 is affirmative, a wager processing for the rescue pay is executed (step S204). Here, the wager for the rescue pay is received via the touch-screen 19 on the lower LCD 16. In other words, the wager for the rescue pay can be placed only when the count-value Ta has reached the criterion value Ta1. Since the wager processing for the rescue pay is identical to the processing shown in FIG. 5, detailed description of the processing procedure is omitted.

Subsequently, it is determined whether or not the start switch 27 is pressed (step S205). If the start switch 27 is pressed, the processing proceeds to step S206.

Next, a slot game execution processing is executed (step S206). Here, a processing of stopping the symbols having been continuously-and-variably displayed on respective three display areas Q1 to Q3 (=a processing of rearranging the symbols having been arranged on respective three display areas Q1 to Q3) is executed. Since the slot game execution processing is identical to the processing shown in FIG. 6, detailed description of the processing procedure is omitted.

Next, a reset processing is executed (step S207). The details will be described below, referring to the flow chart of FIG. 14.

Next, a rescue pay execution processing is executed (step S208). In this processing, if a payout equal to or larger than a specified amount (e.g., a ×60 or higher payout) has not been awarded during a predefined number of executed unit games, a free game flag is set to "1" and a rescue pay is activated. Since the rescue pay execution processing is identical to the processing shown in FIG. 8, detailed description of the processing procedure is omitted.

Next, a payout processing is executed (step S209). In this processing, if a winning combination is formed by the rearranged symbols on the three display areas Q1 to Q3, or if the progressive bonus is awarded, a payout is awarded (provided with medals and so on) to the player. Subsequently, the processing proceeds to the next unit game.

Figure 13:
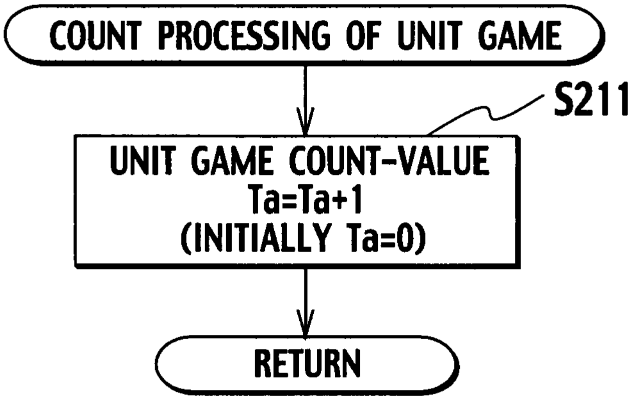
FIG. 13 is a flow chart illustrating the processing procedure according to one embodiment of the present invention.

Next, the count processing of the unit game of step S202 of FIG. 12 will be described with reference to the flow chart shown in FIG. 13. Here, the count-value Ta of the unit game is incremented [Ta=Ta+1] (step S211). Subsequently, the processing is completed.

Figure 14:
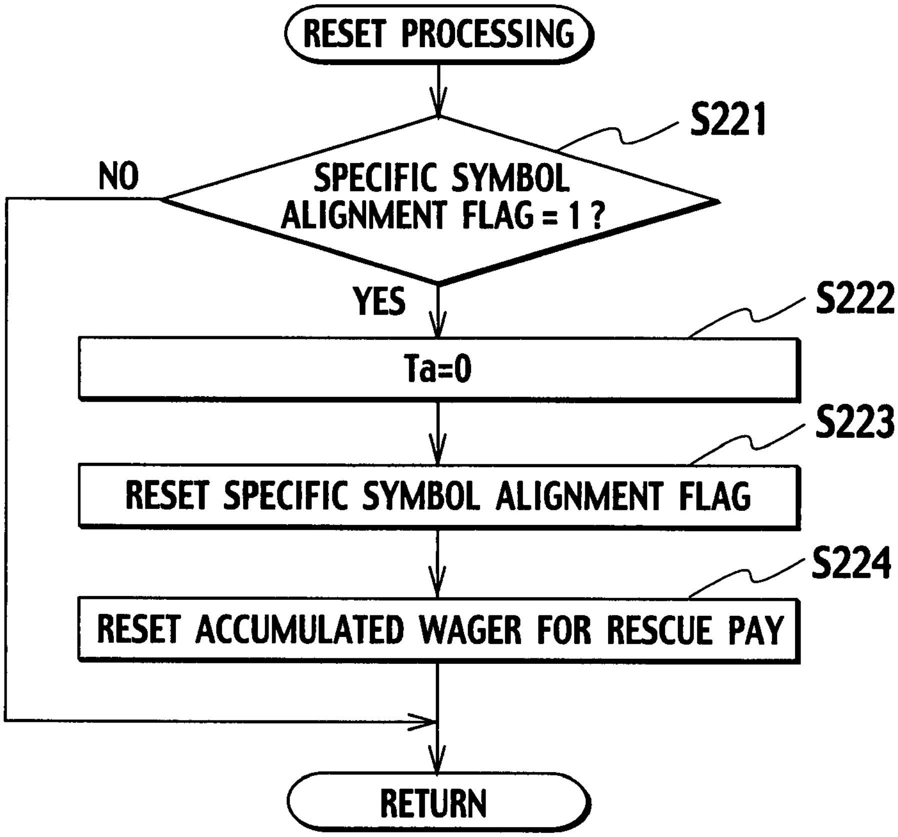
FIG. 14 is a flow chart illustrating the processing procedure according to one embodiment of the present invention.

Next, the reset processing of step S207 of FIG. 12 will be described with reference to the flow chart shown in FIG. 14. First, it is determined whether or not the specific symbol alignment flag is "1" (step S221). If the specific symbol alignment flag is "1" (YES in step S221), the count-value Ta is reset (step S222). Furthermore, the specific symbol alignment flag is also reset (step S223). Then, the wager for the rescue pay is also reset (step S224).

In other words, if the specific symbol alignment flag is "1" (that is, if a ×60 or higher payout is awarded) (YES in step S200), both the count-value Ta of the unit game and the wager for the rescue pay in step S204 of FIG. 12 are reset.

On the other hand, if the specific symbol alignment flag is not "1" (NO in step 221), the processing is completed. In other words, if the specific symbol alignment flag is not "1" (NO in step S221), the processing is completed and proceeds to the next unit game without resetting the count-value Ta, the specific symbol alignment flag, and the wager for the rescue pay.

In the slot machine (gaming machine) 10 of the fourth embodiment, as described above, the wager for the rescue pay can be placed only when the count-value Ta of the number of the executed unit games has reached the criterion value Ta1.

Figure 15:
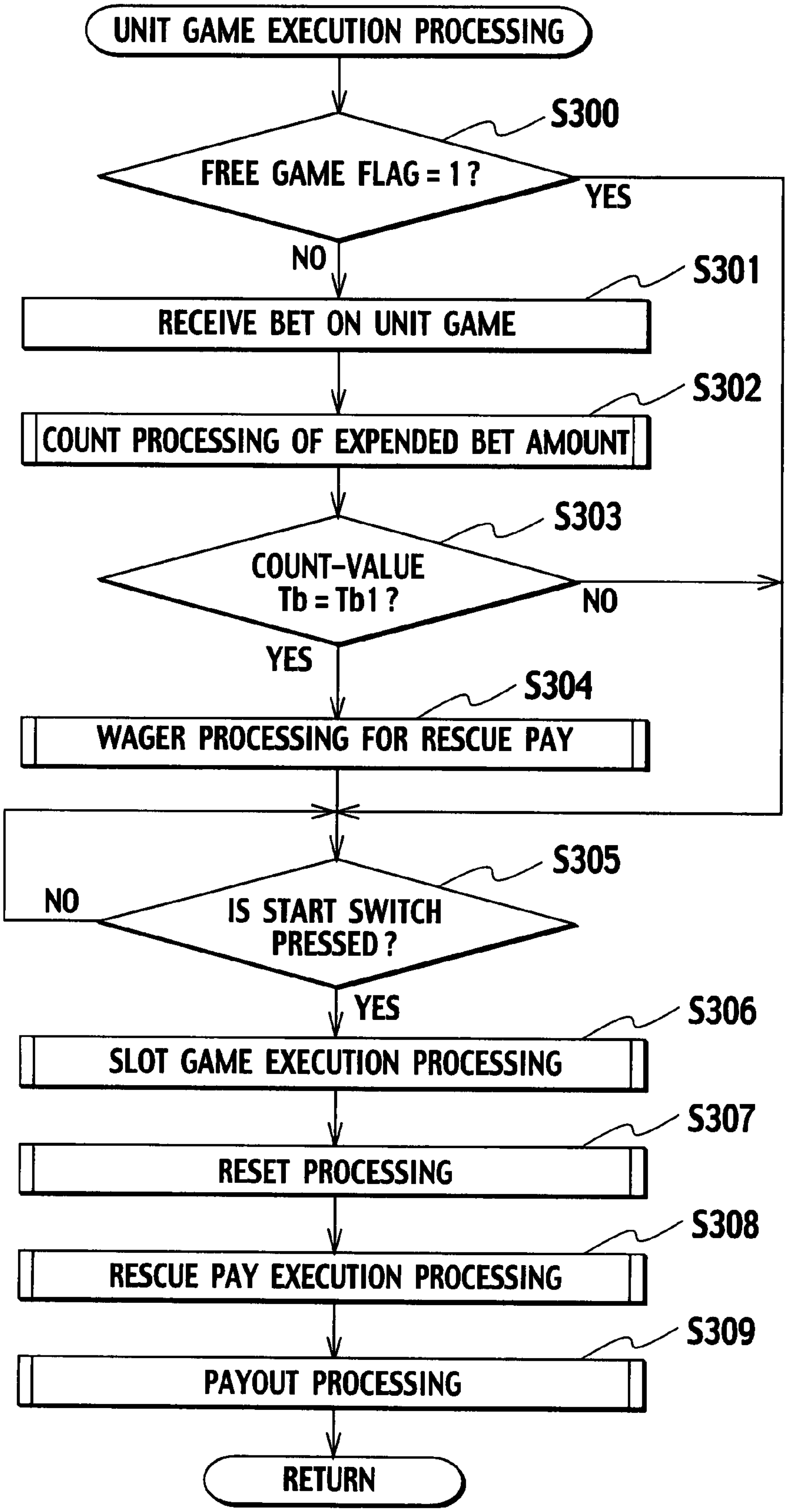
FIG. 15 is a flow chart illustrating the processing procedure according to one embodiment of the present invention.

Next, a slot machine (gaming machine) 10 of the fourth embodiment of the present invention 10 will be described. FIG. 15 is a flow chart illustrating the procedure of the unit game execution processing in the slot machine 10 according to the fourth embodiment. After starting a unit game, it is determined whether or not the free game flag is set to "1" (step S300). If the free game flag is "1" (YES in step S300), the processing proceeds to step S305. On the other hand, if the free game flag is riot "1" (NO in step S300), the processing proceeds to step S301.

A bet on the unit game is received (step S301) Specifically, the insertion of the medal(s) into the medal insertion slot 21 or the pressing-down of the bet switches 24, 25 is detected by the CPU 106.

Next, a count processing of the expended bet amount is executed (step S302). The count processing of the expended bet amount will be described referring to the flow chart of FIG. 16. Subsequently, it is determined whether or not the count-value Tb, which is counted in the count processing of the expended bet amount of step S302, reaches a preset criterion value Tb1 (e.g., Tb1=300) (step S303). Then, if the count-value Tb reaches the criterion value Tb1 (YES in step S303), the processing proceeds to step S304. On the other hand, the count-value Tb does not reach the criterion value Tb1 (NO in step S303), the processing proceeds to step S305.

If the determination of step S303 is affirmative, a wager processing for the rescue pay is executed (step S304). Here, the wager for the rescue pay is received via the touch-screen 19 on the lower LCD 16. In other words, the wager for the rescue pay can be placed only when the count-value Tb has reached the criterion value Tb1. Since the wager processing for the rescue pay is identical to the processing shown in FIG. 5, detailed description of the processing procedure is omitted.

Subsequently, it is determined whether or not the start switch 27 is pressed (step S305). If the start switch 27 is pressed, the processing proceeds to step S306.

Next, a slot game execution processing is executed (step S306). Since the slot game execution processing is identical to the processing shown in FIG. 6, detailed description of the processing procedure is omitted.

Next, a reset processing is executed (step S307). The details will be described below, referring to the flow chart of FIG. 17.

Next, a rescue pay execution processing is executed (step S308). In this processing, if a payout equal to or larger than a specified amount (e.g., a ×60 or higher payout) has not been awarded during a predefined number of executed unit games, a free game flag is set to "1" and a rescue pay is activated. Since the rescue pay execution processing is identical to the processing shown in FIG. 8, detailed description of the processing procedure is omitted.

Next, a payout processing is executed (step S309). In this processing, if a winning combination is formed by the rearranged symbols on the three display areas Q1 to Q3, or if the rescue pay is awarded, a payout is provided (as medals or credits) to the player. Subsequently, the processing proceeds to the next unit game.

Figure 16:
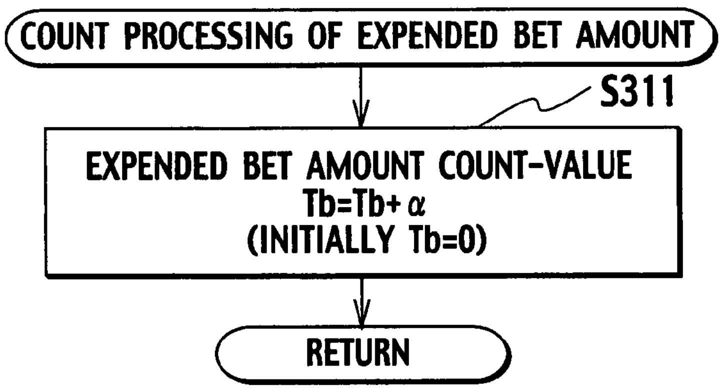
FIG. 16 is a flow chart illustrating the processing procedure according to one embodiment of the present invention.

Next, the count processing of the expended bet amount of step S302 of FIG. 15 will be described with reference to the flow chart shown in FIG. 16. Here, a newly placed bet amount a is added to the count-value Tb of the current expended bet amount [Tb=Tb+α] (step S311). Subsequently, the processing is completed.

Figure 17:
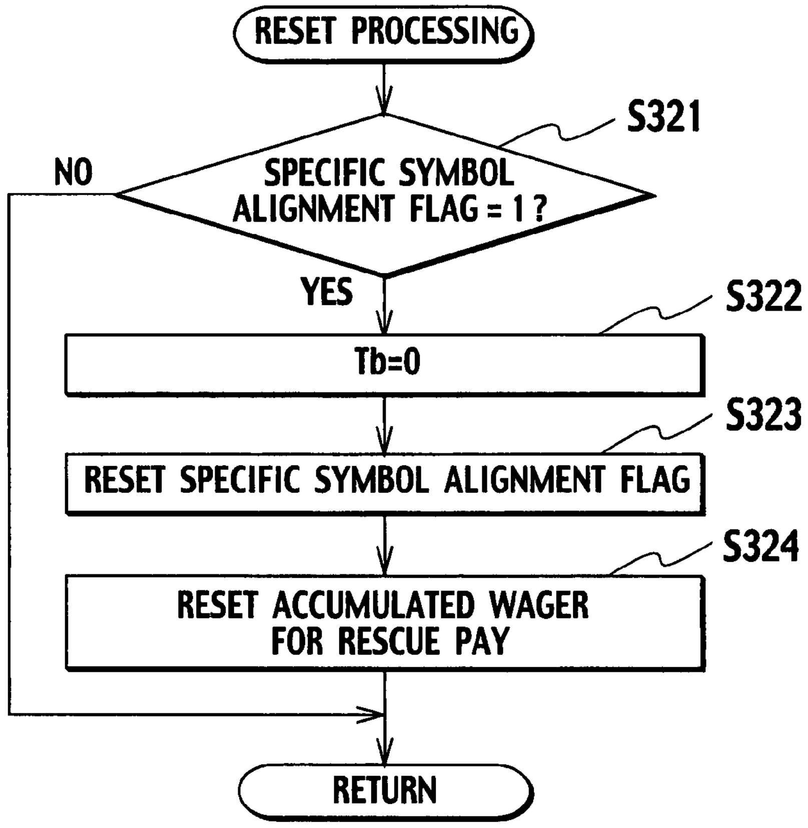
FIG. 17 is a flow chart illustrating the processing procedure according to one embodiment of the present invention.

Next, the reset processing of step S307 of FIG. 15 will be described with reference to the flow chart shown in FIG. 17. First, it is determined whether or not the specific symbol alignment flag is "1" (step S321). If the specific symbol alignment flag is "1" (YES in step S321), the count-value Tb is reset (step S322). Furthermore, the specific symbol alignment flag is also reset (step S323). Then, the wager for the rescue pay is also reset (step S324).

In other words, if the specific symbol alignment flag is "1" (that is, if a payout of ×60 or higher is awarded) (YES in step S321), both the count-value Tb of the expended bet amount and the wager for the rescue pay in step S304 of FIG. 15 are reset.

On the other hand, if the specific symbol alignment flag is not "1" (NO in step 321), the processing is completed. In other words, if the specific symbol alignment flag is not "1" (NO in step S321), the processing is completed and proceeds to the next unit game without resetting the count-value Tb, the specific symbol alignment flag, and the wager for the rescue pay.

In the slot machine (gaming machine) 10 of the fourth embodiment, as described above, the wager for the rescue pay can be placed only when the count-value Tb of the expended bet amount has reached the criterion value Tb1.

The gaming machine and playing method of the present invention have been described above, based on the illustrated embodiments. However, the present invention is not limited to the stated embodiments. The arrangement of respective components may be replaced by any components having similar functionalities.

In addition, the number of execution times n of the free games is randomly determined in each of the above-mentioned embodiments. However, the present invention is not limited to this, and the number of execution times n of the free games may be set to a constant. Here, when setting the number of execution times n of the free games to a constant, the number of execution times data may be preliminarily stored in the ROM 108, and the CPU 106 may read the data and set the number of execution times of the free games. Although the number of execution times of the free games is set to a constant, the amount of the rescue pay is not constant since a payout as the rescue pay (insurance pay) is provided according to the outcome of respective free games. Therefore, the free games (=the rescue pay) of the slot machine 10 of the present embodiment can provide further gaming entertainment in itself.

For example, in the above-mentioned embodiment, three display areas Q1 to Q3 are provided on the lower LCD 16, and the slot game is executed on respective display areas Q1 to Q3. However, the present invention, which is not limited to this arrangement, can be applied to various display areas such as a three-row×five-column display area.

Additionally, with the above-mentioned embodiment, the player is supposed to select any of the options by touching the touch-screen 19. However, any of the options may be selected by a switch without using the touch-screen 19.

Furthermore, with the slot machine 10 described in the present embodiment, the slot game is executed by displaying symbol images on the lower LCD 16. However, the present invention, which is not limited to this arrangement, may execute the slot game by turning a drum having a plurality of symbols on its periphery.

Additionally, with the present invention, a slot machine 10 has been described as an example of the gaming machine. However, the present invention, which is not limited to this, can be applied to other gaming machines such as a horse race game, for example.

What is claimed is:

1. A gaming machine with an insurance pay, comprising:
- a display for displaying an image relating to a unit game, in which it is determined whether or not an awarding outcome is provided to a player;
- a counter for accumulating a count-value with successive execution of the unit games, and resetting the count-value when a predefined reset condition is met; and
- a controller operable to:
  - (a) receive a first wager on the unit game;
  - (b) award a predefined payout to the player when an outcome of the unit game turns out to be a specific outcome;
  - (c) receive a second wager for the insurance pay;
  - (d) accumulate the count-value with successive execution of the unit games;
  - (e) execute transition into a free game which does not require the first wager, when the count-value reaches a predefined value in the unit game with the second wager; and
  - (f) determine the number of execution times of the free game at random;
- and (g) provide the insurance pay according to an outcome of the free game;
  - wherein the predefined reset condition is that the outcome of the unit game turns out to be the specific outcome.

2. A method of controlling a gaming machine with an insurance pay feature and having a controller, the method comprising:
- via the controller, receiving a first wager on a unit game;
- via the controller, awarding a predefined payout to a player when an outcome of the unit game turns out to be a specific outcome;
- via the controller, receiving a second wager, separately from the first wager, that is required in order for the player to receive an insurance payout;
- via the controller, accumulating a count-value with each successive execution of a unit game in connection with which one of said second wagers has been placed, with the count-value being reset when a predefined reset condition is met;
- via the controller, executing transition into a fixed number of free games which do not require the first wager when the count-value reaches a predefined value in a unit game in connection with which one of said second wagers has been placed; and
- via the controller, providing the insurance payout according to an outcome of the free game
  - wherein the predefined reset condition is that the outcome of the unit game turns out to be the specific outcome.

* * * * *